(12) United States Patent
Kuchi et al.

(10) Patent No.: US 12,556,439 B2
(45) Date of Patent: *Feb. 17, 2026

(54) METHOD AND APPARATUS FOR PRE DFT RS AND DATA MULTIPLEXED DFT-S-OFDM WITH EXCESS BANDWIDTH SHAPING

(71) Applicant: WISIG NETWORKS PRIVATE LIMITED, Hyderabad (IN)

(72) Inventors: Kiran Kumar Kuchi, Hyderabad (IN); Saidhiraj Amuru, Hyderabad (IN); Gudimitla Koteswara Rao, Srikalahast (IN); Makandar Sibgath Ali Khan, Sangareddy (IN); Sakshama Ghoslya, Jaipur (IN)

(73) Assignee: WISIG NETWORKS PRIVATE LIMITED (IN)

(*) Notice: Subject to any disclaimer, the term of this patent is extended or adjusted under 35 U.S.C. 154(b) by 345 days.

This patent is subject to a terminal disclaimer.

(21) Appl. No.: 18/127,124

(22) Filed: Mar. 28, 2023

(65) Prior Publication Data
US 2023/0327930 A1  Oct. 12, 2023

(30) Foreign Application Priority Data

Apr. 12, 2022 (IN) .............................. 202241021881
May 26, 2022 (IN) .............................. 202241030361

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01); *H04L 5/0094* (2013.01); *H04L 27/2605* (2013.01); *H04L 27/2628* (2013.01)

(58) Field of Classification Search
None
See application file for complete search history.

(56) References Cited

U.S. PATENT DOCUMENTS

| | | | | |
|---|---|---|---|---|
| 2018/0375707 A1* | 12/2018 | Bala | .................... | H04L 27/2605 |
| 2019/0356526 A1* | 11/2019 | Kuchi | ................. | H04J 11/0023 |
| 2020/0052947 A1* | 2/2020 | Sahin | ................ | H04W 72/0453 |
| 2025/0039032 A1* | 1/2025 | Gulati | ............... | H04L 27/26538 |

* cited by examiner

*Primary Examiner* — Walter J Divito
(74) *Attorney, Agent, or Firm* — McAndrews Held & Malloy, Ltd.

(57) ABSTRACT

Embodiments of the present disclosure relate to generating pre DFT RS and data multiplexed DFT-S-OFDM with excess bandwidth shaping. The RS and user data are transmitted in different OFDM symbols, such that channel estimation to equalize the data can be estimated clearly at the receiver. The present disclosure a method for transmitting a waveform is disclosed. The method comprising generating, by a transmitter, at least one of: at least one data sequence and at least one reference sequence (RS). Also the method comprises time-multiplexing the at least one data sequence with the at least one RS, to generate a multiplexed sequence, and generating a filtered-extended bandwidth DFT-s-OFDM symbol using the multiplexed sequence. Also, the method transmits RS and user data in one OFDM symbol with DFT-s-OFDM, which eventually offers low PAPR. Further, the method transmits only RS so that low PAPR is achieved.

39 Claims, 28 Drawing Sheets

| DATA | Pre-fix for DMRS | RS | Post-fix for DMRS | DATA |
|---|---|---|---|---|

| RS | Post-fix | Data | RS |

Figure 5

| DATA | Pre-fix | RS | Post-fix | DATA | Pre-fix | RS | Post-fix | DATA |

Figure 6

| Pre-fix | RS | Post-fix | DATA | Pre-fix | RS | Post-fix | DATA |

Figure 7

| RS | Post-fix | Data | Pre-fix | RS | Post-fix | Data | Pre-fix | RS |

Figure 8

| RS | Post-fix | Data | RS |

Figure 9

| Data | Pre-fix | RS | Post-fix | DATA | RS | Data |

Figure 10

METHOD AND APPARATUS FOR PRE DFT RS AND DATA MULTIPLEXED DFT-S-OFDM WITH EXCESS BANDWIDTH SHAPING

CROSS-REFERENCE TO RELATED APPLICATIONS

This application claims priority from the Indian Provisional Patent Application Numbers i) 202241021881, filed on Apr. 12, 2022; and ii) 202241030361 filed on May 26, 2022, the entirety of which are hereby incorporated by reference.

TECHNICAL FIELD

Embodiments of the present disclosure are related, in general to communication, but exclusively relate to methods and apparatus for generating and transmitting pre-Discrete Fourier Transform (DFT) reference sequence (RS) and Data multiplexed DFT-S-OFDM with excess bandwidth shaping.

BACKGROUND

3GPP (3rd Generation Partnership Project) has developed 5G-NR standards to support use cases like eMBB, URLLC, MMTC. It has been agreed to use CP-OFDM waveform and DFT-s-OFDM waveform for uplink transmission in 5G-NR. Here, CP-OFDM is mainly used for higher data rates, while, because of its low PAPR and high-power efficiency, DFT-s-OFDM is used to serve the cell edge UEs. In DFT-s-OFDM, the data is first precoded by taking a DFT of allocation size before mapping the data to the allocated sub-carriers. The DFT-s-OFDM is essentially a single carrier modulation scheme. Hence, DFT-s-OFDM has lower PAPR compared to OFDM. Furthermore, DFT-s-OFDM has similar robustness to the frequency selective fading as OFDM as cyclic prefix is introduced to reduce Inter Symbol Interference (ISI).

To further reduce the PAPR of DFT-s-OFDM waveform, waveform-based solutions like Pi/2-BPSK modulation is used to modulate the user data. On the DFT precoded pi/2-BPSK symbols spectrum shaping filter is applied to reduce the PAPR further. Low PAPR allows the signal to be transmitted at higher transmitting power by reducing the PA power back-off. However, spectrum shaping along with DFT precoding may not show much effect on the PAPR of higher modulation schemes resulting in no improvement in increasing the transmit signal power. Additionally, current 5G standards uses slot structure, where user data is transmitted in series of OFDM symbols. A typical slot structure comprises of one or more data symbols and one or more reference symbols.

6G Mobile Communication System requires a method of information transmission and that offers extremely low latency, very high data rate, and very high-power efficiency. DFT-S-OFDM waveform, which is power efficient and supports high data rates is well suitable for this purpose. However, to achieve extremely low latency, it is desirable to transmit the information (like user data, RS, and control information) in a single shot i.e., using a single OFDM symbol. However, conventional DFT-S-OFDM requires at least one data symbol and at least one reference symbol (RS). The RS is required for the purpose of estimating the channel state information (CSI) and subsequent equalization of data symbol. The current two-symbol structure in 5G-NR not only doubles the latency (compared to single symbol case), but also has a higher RS overhead i.e., 50%. There is a need for a new type of waveform that allows one shot transmission with flexible RS overhead and high-power efficiency.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method for transmitting a waveform is disclosed. The method comprising generating, by a transmitter, at least one of: at least one data sequence and at least one reference sequence (RS). Also the method comprises time-multiplexing the at least one data sequence with the at least one RS, to generate a multiplexed sequence, and generating a filtered-extended bandwidth DFT-s-OFDM symbol using the multiplexed sequence.

In another aspect of the present disclosure a method for receiving a waveform is provided. The method comprising, processing, by a receiver, the received waveform to detect a data of interest. Also, the method comprises a channel estimation using at least one reference sequence (RS) in the received waveform, wherein said channel estimation is used to detect at least one of a data and a control sequence of interest. The received waveform is being facilitated using a slot, said slot comprises a plurality of OFDM symbols, said plurality of OFDM symbols includes at least one of a at least one filtered-extended bandwidth DFT-s-OFDM symbol comprising of RS and data, at least one filtered-extended bandwidth DFT-s-OFDM symbol comprising of full RS, and at least one filtered-extended bandwidth DFT-s-OFDM symbol comprising of full data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

FIG. 5 shows a symbol with two RS chunks at the symbol boundaries and data in the middle of OFDM symbol;

FIG. 6 shows an example symbol with RS along with pre-fix and post-fix;

FIG. 7 shows another example symbol with RS along with pre-fix and post-fix starting;

FIG. 8 shows a symbol with two RS chunks at the symbol boundaries, one in the middle for channel estimation;

FIG. 9 shows a symbol structure with two RS chunks at the symbol boundaries and data in the middle of OFDM symbol for phase tracking;

FIG. 10 shows a symbol structure for phase tracking;

Figure 37:
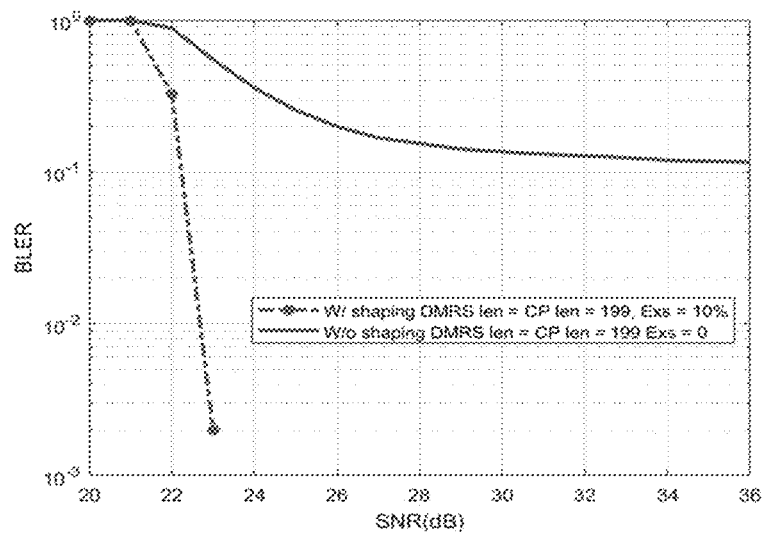
Figure 38:
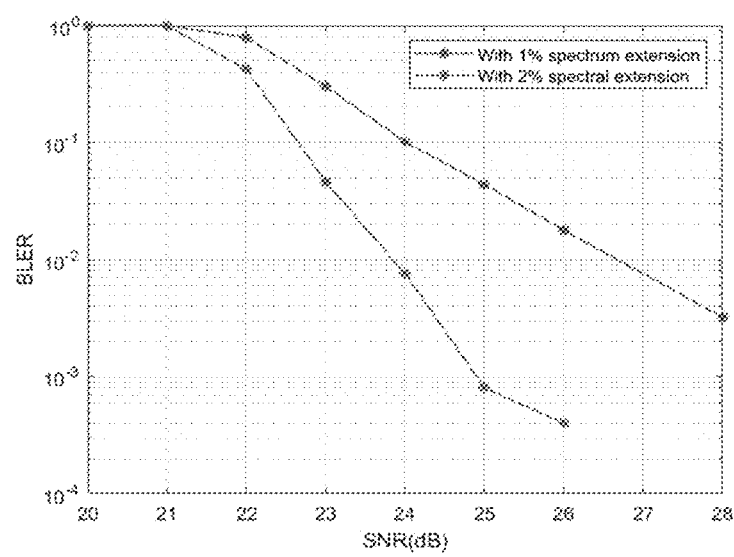
Figure 39:
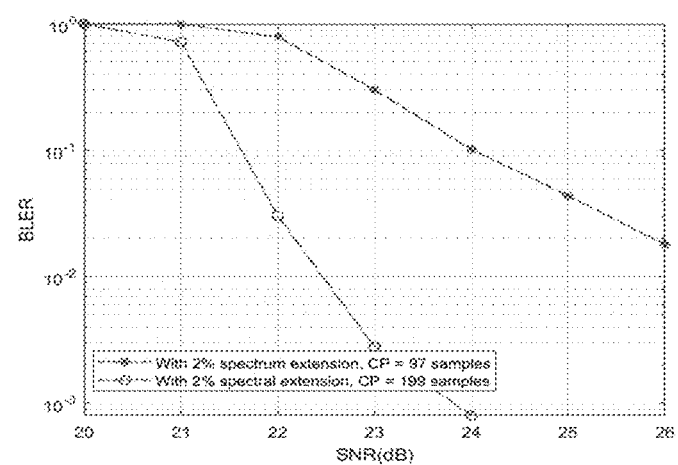
Figure 40:
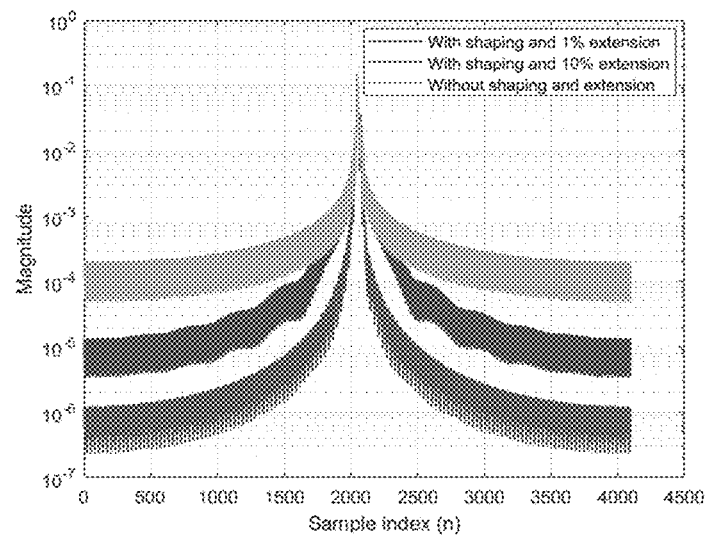
Figure 41:
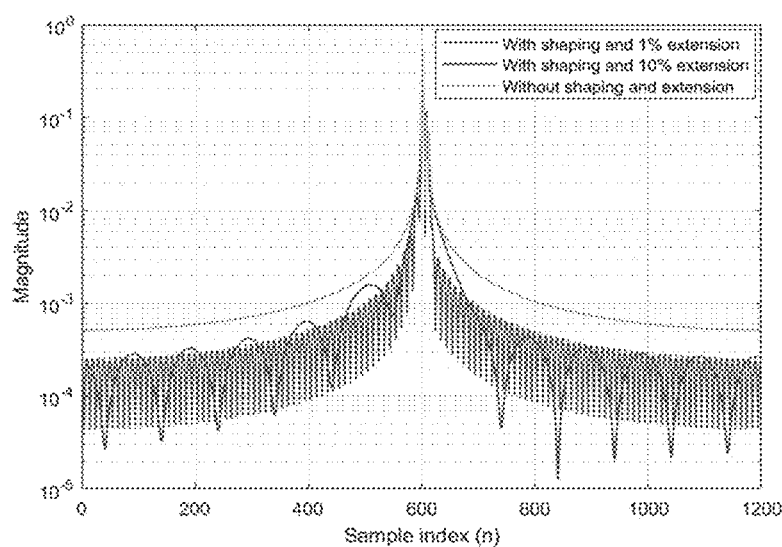
Figure 42:
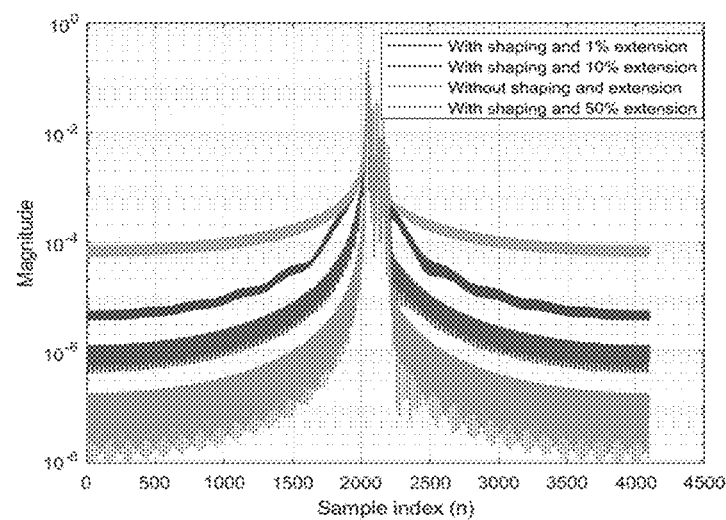
Figure 43:
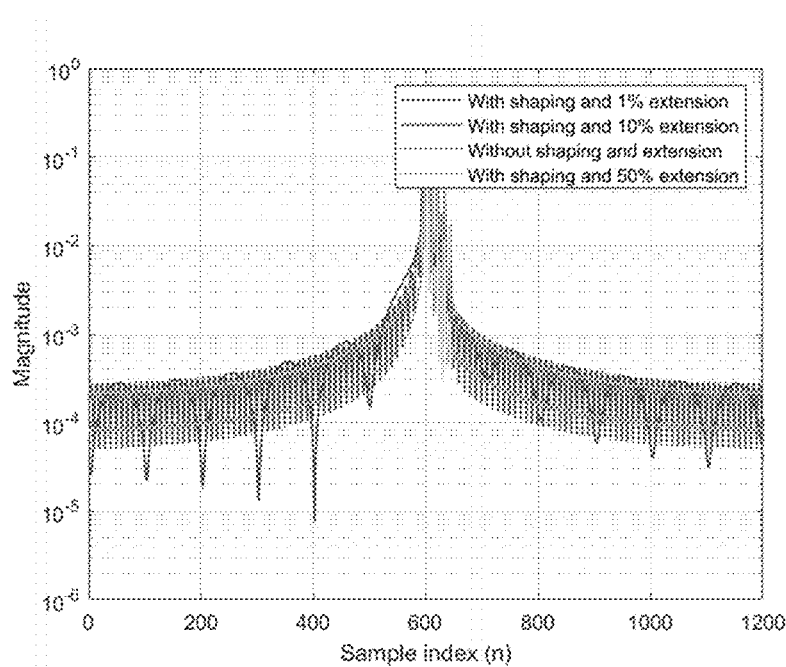
Figure 44:
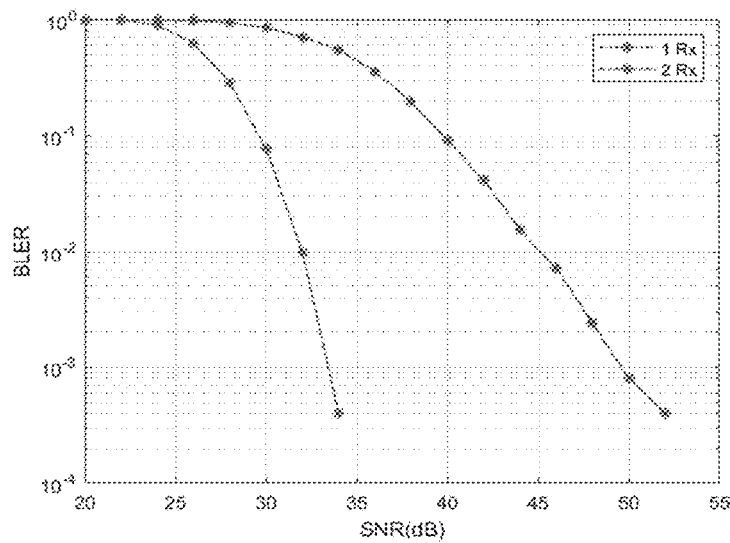
Figure 45:
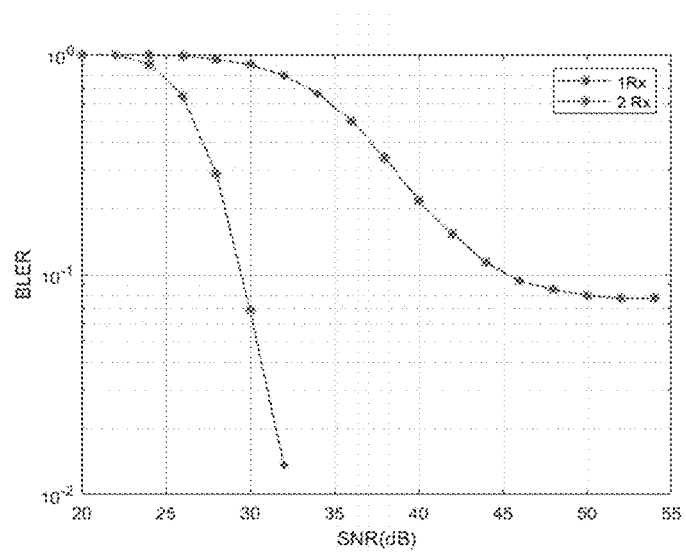
Figure 46:
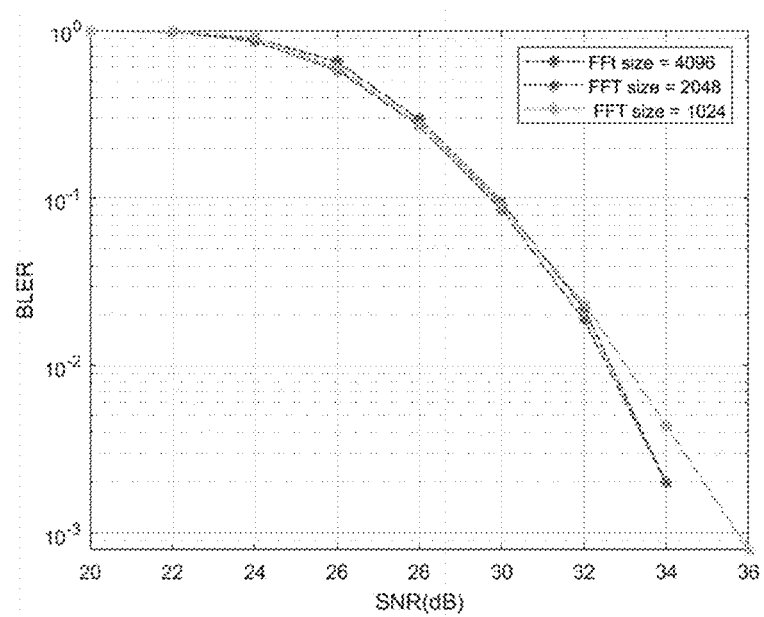
Figure 47:
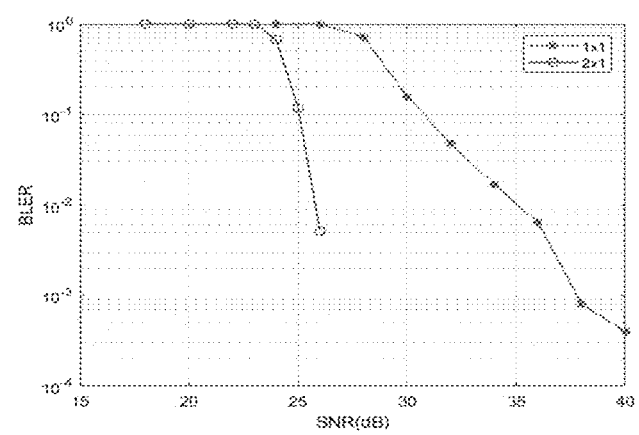
Figure 48:
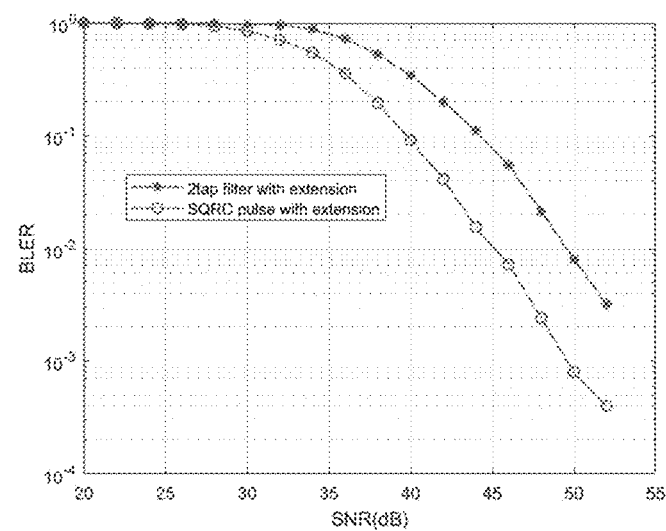
Figure 49:
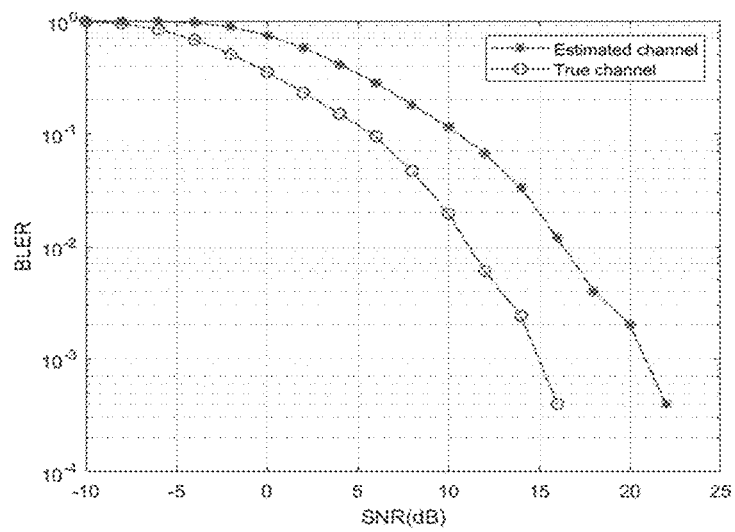
Figure 54:
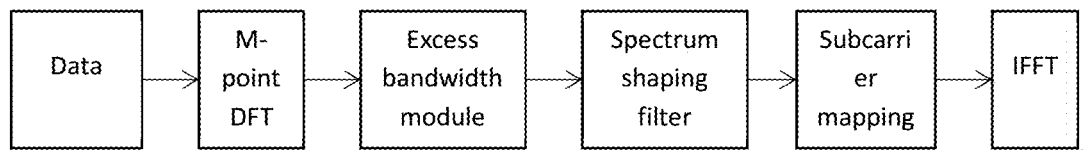
Figure 55:
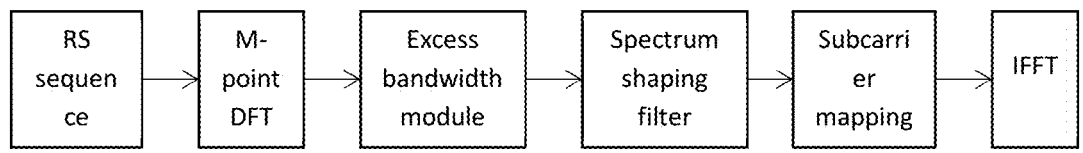
Figure 56:
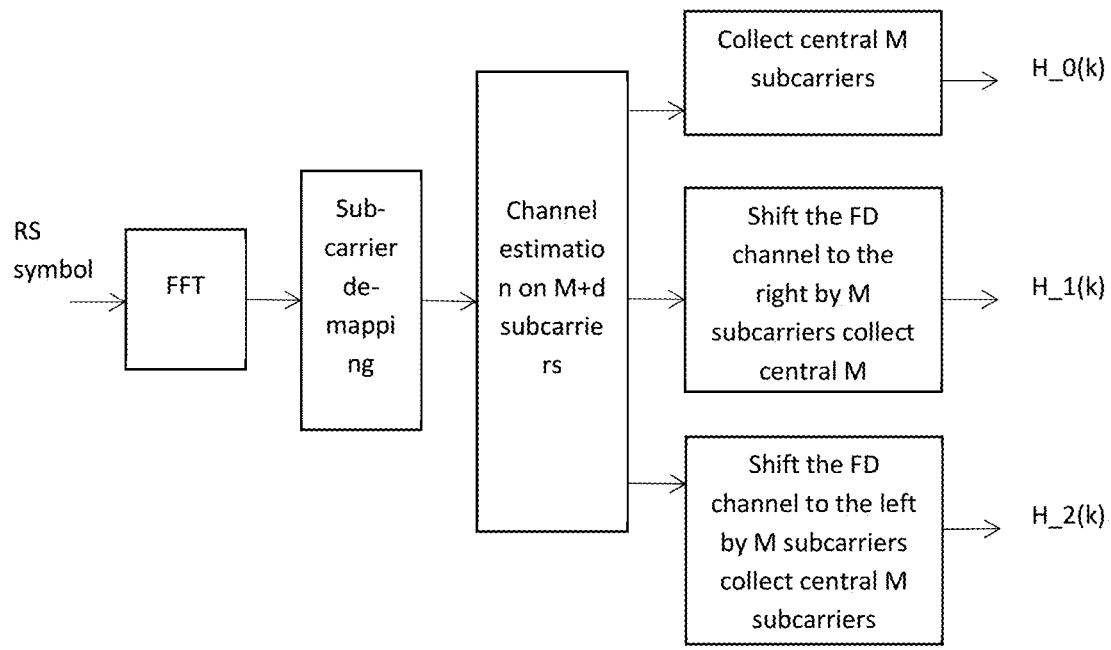
Figure 57:
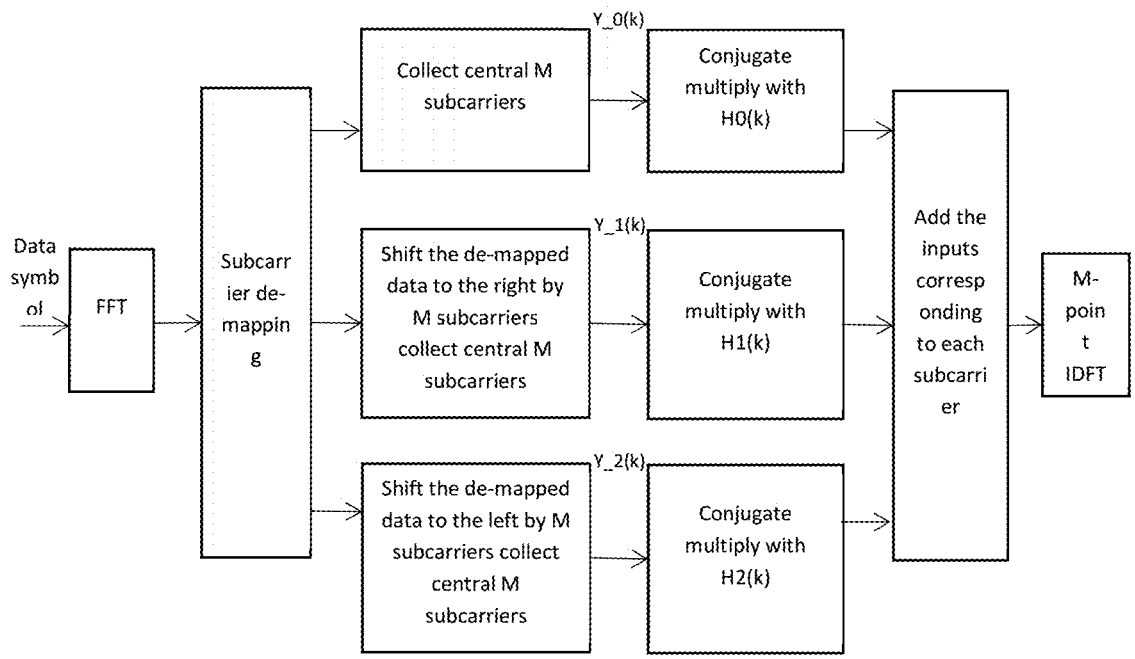
Figure 58:
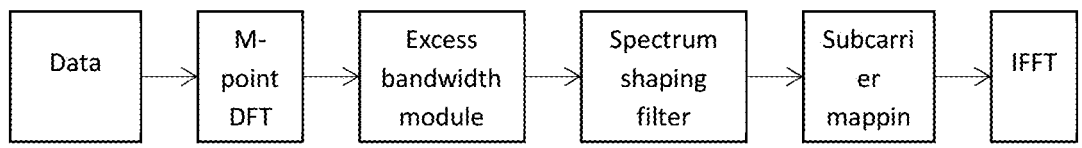
Figure 59:
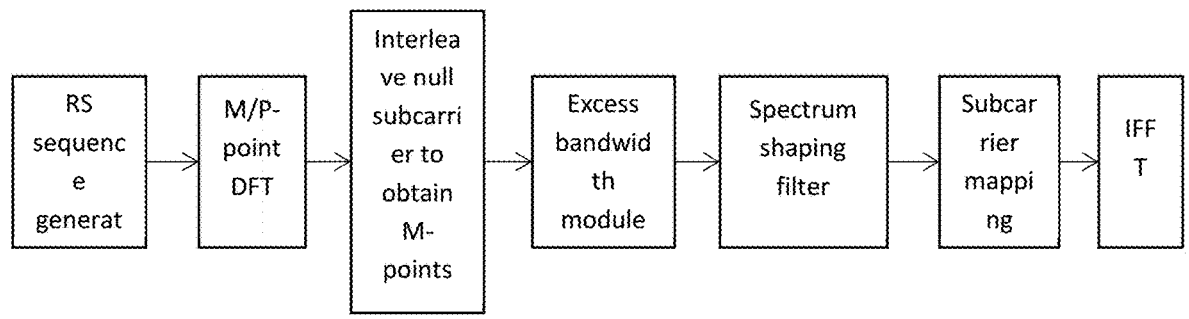
Figure 60:
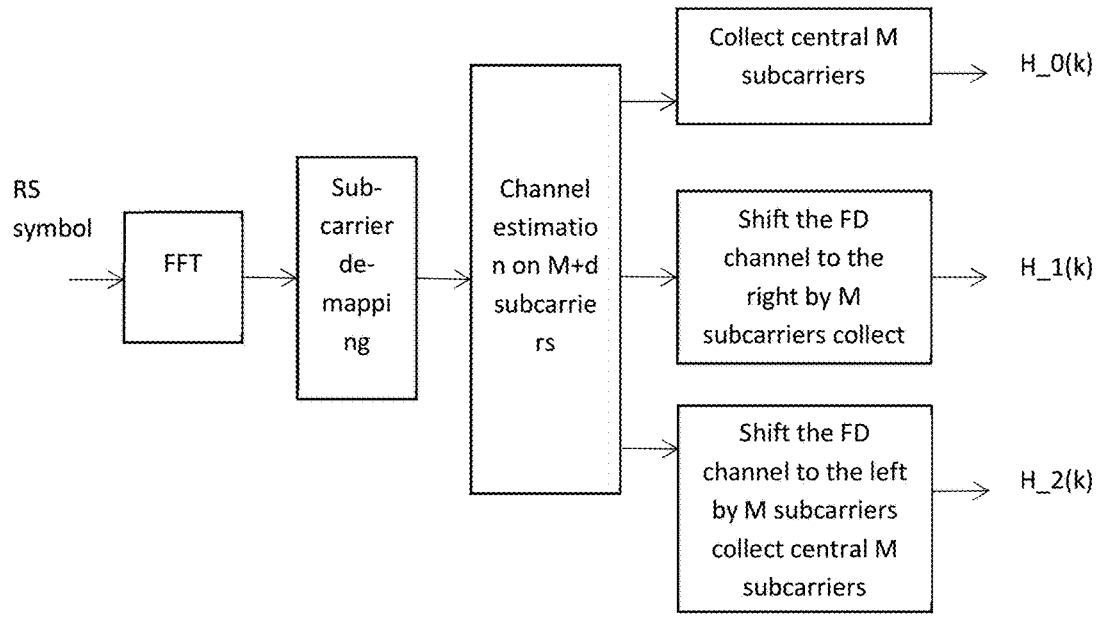
Figure 61:
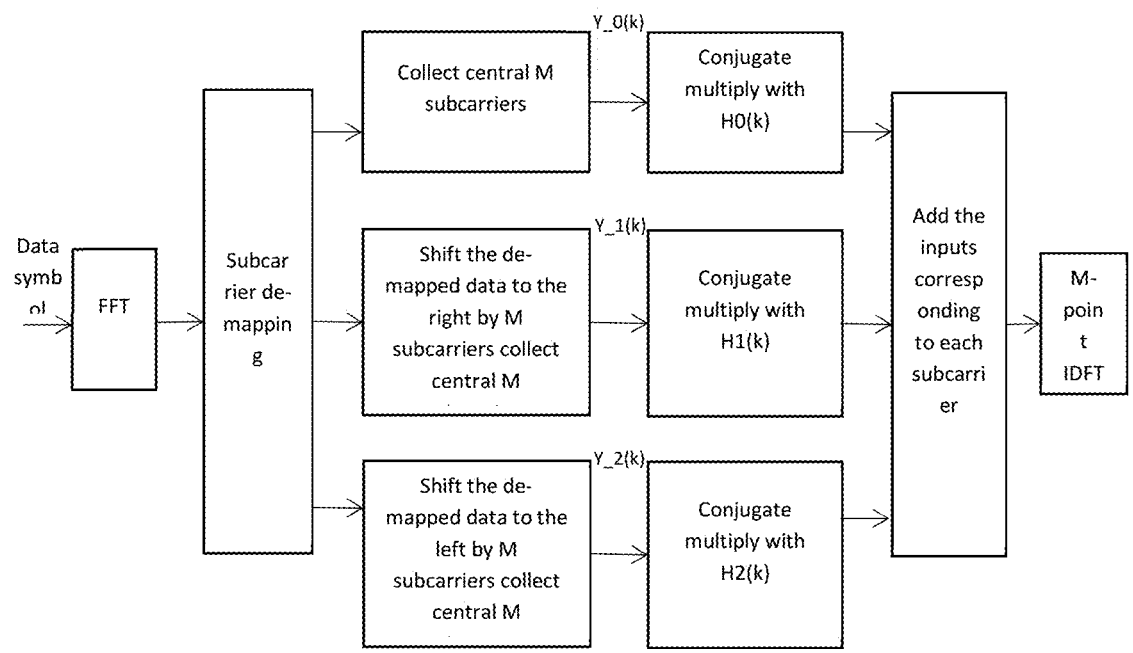
Figure 62:
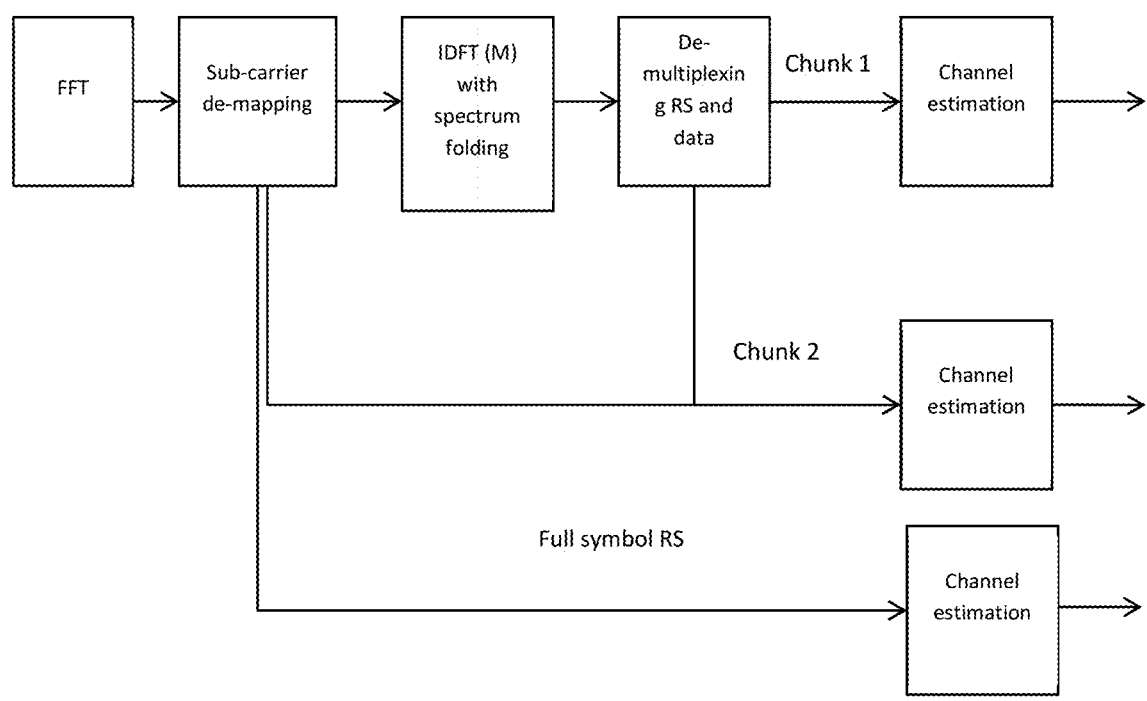
Figure 63:
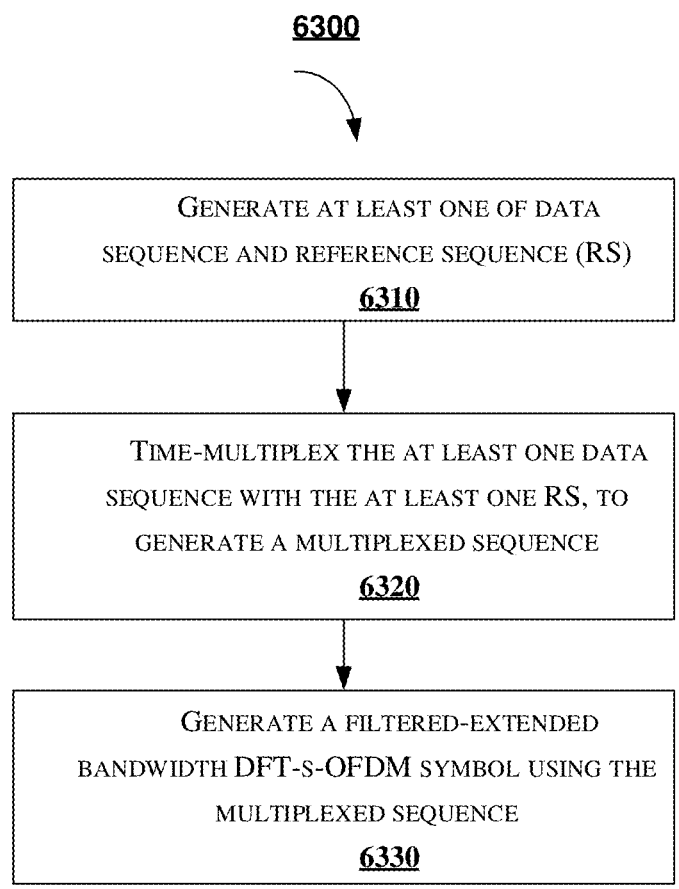

The FIG. 37 shows a plot illustrating BLER performance comparison in one sample delay channel, with and without spectrum extension and shaping;

FIG. 38 shows a plot illustrating BLER performance comparison in delay 5/1200 channel, with different spectrum extension values and same RS, CP lengths;

FIG. 39 shows a plot illustrating BLER performance comparison in delay 5/1200 channel, with same spectrum extension values and different RS, CP lengths;

FIG. 40 shows a plot illustrating effective channel on the OFDM symbol post cp removal at the receiver for TDL-C 100 nsec;

FIG. 41 shows a plot illustrating an effective channel on the OFDM symbol post IDFT at the receiver for TDL-C 100 nsec;

FIG. 42 shows a plot illustrating an effective channel on the OFDM symbol post cp removal at the receiver for TDL-C 300 nsec;

FIG. 43 shows a plot illustrating effective channel on the OFDM symbol post IDFT at the receiver for TDL-C 300 nsec;

FIG. 44 shows a plot illustrating BLER performance in TDL-C 100 nsec with 28% RS+CP OH for 1×1 and 2×1 systems and 256 QAM, R=0.89 (M=1200), 10% extension;

FIG. 45 shows a plot illustrating BLER performance in TDL-C 300 nsec with 32% RS+CP OH for 1×1 and 2×1 systems and 256 QAM, R=0.89 (M=1200), 10% extension;

FIG. 46 shows a plot illustrating BLER performance in TDL-C 100 nsec with 20% RS+CP OH for 2×1 system and 256 QAM and R=0.89 with different FFT sizes (M=600), 10% extension;

FIG. 47 shows a plot illustrating BLER performance in TDL-E 100 nsec with 28% RS+CP OH for 1×1 and 2×1 system and 256 QAM, R=0.89 with different FFT sizes (M=1200), 10% extension;

FIG. 48 shows a plot illustrating BLER performance in TDL-E 100 nsec with 28% RS+CP OH for 2×1 stem and 256 QAM, R=0.89 comparing SQRC and 2-tap filters (M=1200), 10% extension;

FIG. 49 shows a plot illustrating BLER performance in TDL-C 100 nsec with 21% RS+CP OH for 1×1 system and pi/2-BPSK modulation comparing true channel and estimated channel (M=1200), 10% extension FIGS. 50 to 53 show an illustration of symbol structures for transmission in a slot;

FIG. 54 shows a block diagram of a transmitter for data transmission in one OFDM symbol with spectrum shaping and excess bandwidth;

FIG. 55 shows a block diagram of a transmitter for transmission of RS in one OFDM symbol with spectrum shaping and excess bandwidth;

FIGS. 56 and 57 shows a block diagram of a receiver for receiving a DFT-s-OFDM signal, RS and data, in accordance with some embodiments of the present disclosure FIG. 58 shows a block diagram of a transmitter for each user with data in one OFDM symbol with spectrum shaping and excess bandwidth, in accordance with an embodiment of the present disclosure;

FIG. 59 a block diagram of a transmitter for each user with RS in one OFDM symbol with spectrum shaping and excess bandwidth, in accordance with an embodiment of the present disclosure;

FIGS. 60 and 61 shows a block diagram of a receiver for receiving a DFT-s-OFDM signal, in accordance with another embodiment of the present disclosure;

FIG. 62 shows a block diagram of a receiver, in another embodiment of the present disclosure; and FIG. 63 shows a flow chart of a method for generating a waveform; in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Embodiments of the present disclosure relate to a method for transmitting a waveform. The method comprising generating, by a transmitter, at least one of: at least one data sequence and at least one reference sequence (RS). Also the method comprises time-multiplexing the at least one data sequence with the at least one RS, to generate a multiplexed sequence, and generating a filtered-extended bandwidth DFT-s-OFDM symbol using the multiplexed sequence.

Also, embodiments of the present disclosure relate to a method for receiving a waveform. The method comprising, processing, by a receiver, the received waveform to detect a data of interest. Also, the method comprises a channel estimation using at least one reference sequence (RS) in the received waveform, wherein said channel estimation is used to detect at least one of a data and a control sequence of interest. The received waveform is being facilitated using a slot, said slot comprises a plurality of OFDM symbols, said plurality of OFDM symbols includes at least one of a at least one filtered-extended bandwidth DFT-s-OFDM symbol comprising of RS and data, at least one filtered-extended bandwidth DFT-s-OFDM symbol comprising of full RS, and at least one filtered-extended bandwidth DFT-s-OFDM symbol comprising of full data.

For obtaining low latency and power efficiency in transmitting a waveform is to use DFT-S-OFDM with RS and Data time multiplexed before the application of DFT precoding. A DFT of size equal to the size of the symbol is applied on the multiplexed data to get the DFT precoded data. The DFT precoded data is then mapped to the allocated subcarriers, which is followed by an IFFT. This method is referred to as pre-DFT RS and Data multiplexing. At the receiver, the RS can be used for channel estimation followed by equalization of the received data. However, in channels where there is a delay (or timing error) at the receiver, the impulse response (IR) or the inter-symbol-interference (ISI) experienced by the system becomes a sinc-like pulse whose length is equal to the DFT size. The power of the channel taps in the IR decays very slowly and therefore an RS of finite size whose length is less than the DFT size will not be able to estimate the complete channel Simulations show that, when RS and Data are multiplexed in this manner, higher order modulation (HOM) suffers from an irreducible error floor.

In an embodiment, an efficient method of transmitting a waveform is obtained by expanding the bandwidth, using additional subcarriers, of the "pre-Discrete Fourier Transform (DFT) reference sequence (RS) and Data multiplexing signal" is followed by shaping a spectrum obtained by a pulse shaping filter such as square-root-raised-cosine pulse that follows Nyquist criterion for zero ISI (when the receiver has no timing error). The filter concentrates most of the channel energy around the main lobe and the side lobes decay to a low enough energy not to cause significant ISI. This method will be referred to as "a filtered-extended bandwidth DFT-s-OFDM symbol or Pre DFT RS and Data Multiplexed DFT-S-OFDM with excess bandwidth shaping". The design parameters are at least one of a RS density (length of RS), the excess BW, Spectrum shaping filter and the DFT size is being selected carefully to eliminate the error floor caused by the ISI channel.

One embodiment of the present disclosure is a transmitter. In the proposed "a filtered-extended bandwidth DFT-s-OFDM symbol" data and RS are transmitted in the same OFDM symbol. Data and RS are multiplexed before DFT-precoding in the time domain. The position of RS can be in the center or starting or ending of the OFDM symbol. The sequence to be used as RS can be pi/2-BPSK, QPSK, or ZC sequences, computer generated sequences or M-PSK sequences. QPSK, pi/2-BPSK sequences may be generated using the binary sequences from Walsh codes, m-sequences, Kasami sequences, Gold sequences, or may be obtained from the pre-defined sequences defined. The generation of these sequences for RS may depend on the cell/sector/Base station ID, scrambling ID, symbol number, subframe number corresponding to the frame and the numerology. ZC sequences generation is defined as $$r(n) = e^{\frac{j\pi n(n+1+2q)}{N_{ZC}}} ; n = \{0, 1, 2, \ldots \ldots N_{ZC} - 1\}$$

$N_{ZC}$ is the length of the sequence that needs to be generated.

The RS sequence obtained using ZC can be a plain ZC sequence or cyclically extended ZC sequence. To support better channel estimation either pre-fix or post-fix or both pre-fix and post-fix will be added to the RS in the time domain. The mentioned pre-fix, also referred as cyclic prefix (CP) or post-fix, also referred as cyclic postfix/suffix (CS) may have at least one sample of the mentioned sequences. The Frequency spectrum of RS could be flat to ensure unbiased channel estimation. RS and CP for RS can occupy a portion of resources allocated to the user, which may depend on properties of channel conditions, excess bandwidth, user allocation size, modulation order, coding rate, and other parameters like impulse response of spectrum shaping filter.

Figure 1:
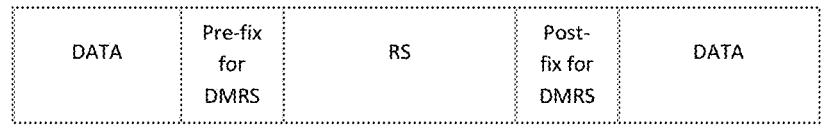
FIG. 1 shows a symbol with data and RS in the middle of OFDM symbol along with both pre-fix and post-fix.
Figure 2:
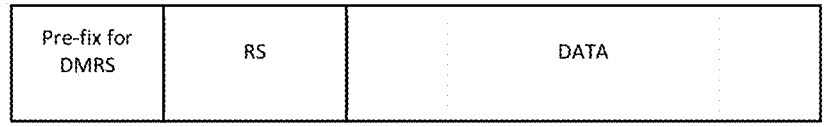
FIG. 2 shows a symbol with Pre-DFT RS and data multiplexed DFT-S-OFDM with excess bandwidth shaping with RS having only pre-fix.
Figure 3:
FIG. 3 shows a symbol with Pre DFT RS and data multiplexed DFT-S-OFDM with excess bandwidth shaping with RS having only post-fix.

FIG. 1 shows a symbol with data and reference signal (RS) in the middle of OFDM symbol along with both pre-fix and post-fix. FIG. 2 shows a symbol with Pre-DFT RS and data multiplexed DFT-S-OFDM with excess bandwidth shaping with RS having only pre-fix. FIG. 3 shows a symbol with Pre DFT RS and data multiplexed DFT-S-OFDM with excess bandwidth shaping with RS having only post-fix. In an embodiment, the RS is also referred as demodulation reference signal (DMRS).

In another embodiment, a multiple RS chunks may be used while multiplexing RS with data. One possible way is to keep more than one chunk of RS samples with each chunk having same number of samples. The RS chunk can occupy any positions in the symbol, like shown the FIGS. 4-8, which are for 2 chunks and 3 chunks. However, it can be extended to any number of chunks and any other configuration. Here, RS in each chunk can be the same sequence or different sequence. Also, all the chunks may either have both pre-fix and post-fix or post-fix or pre-fix. Each chunk may be used for channel estimation and the user data adjacent to the chunk may be equalized with the channel that is estimated. This kind of design helps in tracking the high Doppler channel, which may vary within an OFDM symbol. When RS samples are at the symbol boundaries, they may not need either pre-fix or post-fix or both. Each chunk may have at least 1 RS sample.

Figure 4:
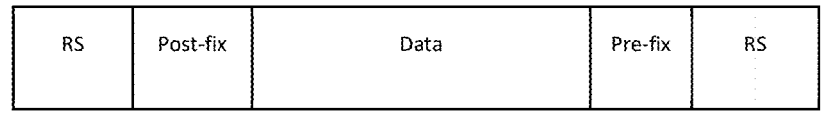
FIG. 4 shows a symbol with two RS chunks with at least one of pre-fix and post-fix at the symbol boundaries and data in the middle of OFDM symbol.

FIG. 4 shows a symbol with two RS chunks with at least one of pre-fix and post-fix at the symbol boundaries and data in the middle of OFDM symbol. FIG. 5 shows a symbol with two RS chunks at the symbol boundaries and data in the middle of OFDM symbol. The RS at the beginning of the symbol may include a post-fix and the RS at the end may be without post-fix and pre-fix. FIG. 6 shows an example symbol with RS along with pre-fix and post-fix. FIG. 7 shows another example symbol with RS along with pre-fix and post-fix starting. FIG. 8 shows a symbol with two RS chunks at the symbol boundaries, one in the middle for channel estimation.

In another embodiment, the size of each RS chunk can be different. Here, size of at least one RS chunk may be larger, while the sizes of all the other chunks is small in size with at least one sample. The main RS chunk with larger RS sizes may have pre-fix or post-fix or both pre-fix and post-fix. Main RS chunk will be used for channel estimation, while the smaller RS chunks may be used for phase tracking within the OFDM symbol. The density of smaller RS chunks and number of smaller RS chunks (which may be one sample also) may depend on phase noise estimation accuracy. FIGS. 9 and 10 shows the symbol structure with two RS chunks, while one has both Pre-fix and post-fix, while the other chunk has no pre-fix or post-fix. Similar symbol structure 3 RS chunks are show in FIGS. 11 and 12. Similar structure can be extended for any number of chunks.

FIG. 9 shows Symbol with two RS chunks at the symbol boundaries with only one RS chunk having post-fix, and other having smaller size without any post-fix and pre-fix. The data placed at the middle of the OFDM symbol. The RS smaller in size may be used for phase tracking. FIG. 10 shows a symbol structure for phase tracking. As shown in FIG. 10, a symbol with RS with pre-fix and post-fix at a predefined position along with RS without post-fix or pre-fix for phase tracking.

Figure 11:
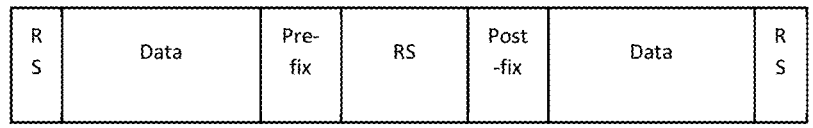
FIG. 11 shows a symbol with two RS chunks at the symbol boundaries for phase tracking, one in the middle for channel estimation.
Figure 12:
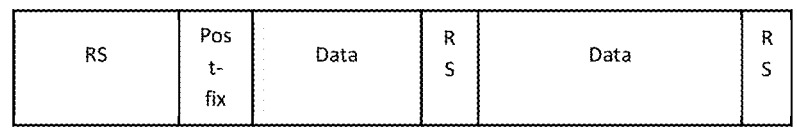
FIG. 12 shows a symbol with two RS chunks at the symbol boundaries, one in the middle for phase tracking.
Figure 13:
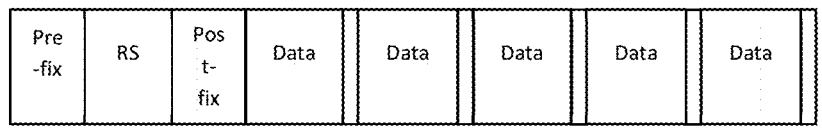
FIG. 13 shows a multiplexed symbol with at least one larger RS chunk with at least one Pre-fix and post fix, and additional at least one RS sample interleaved with data.

FIG. 11 shows a symbol with two RS chunks at the symbol boundaries for phase tracking, one in the middle for channel estimation. FIG. 12 shows a symbol with two RS chunks at the symbol boundaries, one in the middle for phase tracking. Similarly, FIG. 13 shows a multiplexed symbol with at least one larger RS chunk with at least one Pre-fix and post fix, and additional at least one RS sample interleaved with data. The additional smaller RS chunks will be used for phase compensation.

The user data contains pi/2-BPSK, QPSK, QAM, or PAM modulation symbols. Data can be either related to control messages like ACK/NACK, CQI or user specific information. As discussed earlier, in the proposed system the data and RS are time multiplexed. For example, as shown in the FIG. 1, RS with pre-fix and post-fix is located at the center of the symbol, while the data occupies the starting and end positions of the symbol. The multiplexed symbol can be represented by x'(n), where n=0, 1, . . . , M−1. DFT precoding is applied on the resultant multiplexed symbol through an M sized DFT.

$$X(k) = \frac{1}{\sqrt{M}} \sum_{n=0}^{M-1} x'(n) e^{-\frac{j2\pi kn}{M}}; k = \{0, 1, 2, 3, \ldots \ldots M - 1\}; j = \sqrt{-1}$$

It is to be noted that, to maintain the PAPR, when the user data is pi/2-BPSK modulated, then pi/2-BPSK based reference sequences has to be used, and phase continuity is maintained between the RS and user pi/2-BPSK data. Spectrum extension is performed on the DFT pre-coded symbol where, last d/2 samples of the pre-coded data are copied and placed at the beginning of the symbol as pre-fix and then the initial d/2 samples of the pre-coded data are copied and placed at the end of the symbol as post-fix, where d is the spectrum extension factor. This results in an OFDM symbol of size M+d, which can be represented as, $$X_{exs}(k) = X\left(\left(k - \frac{d}{2}\right) \bmod M\right)$$

Where, k=0, 1, . . . , M+d−1. In an embodiment, the excess bandwidth (or excess subcarriers) used may be arbitrarily high and may be more than M subcarriers.

The spectrum extended symbol may also be generated as $$X_{exs}(k)=X((k-K)\bmod M)$$

Where, K may be an arbitrary shift applied on the multiplexed symbol X(k) before spectrum extension.

The additional bandwidth that needs to be used for spectrum extension is indicated to the UE by the base station. Base station may indicate either extension on one side of the allocated bandwidth or two sides of the allocated bandwidth in steps of subcarriers, half PRB or one PRB or multiple of PRBs. The signalling of the excess bandwidth may be done as a part of resource allocation. The Bandwidth extension on the either side of the allocated bandwidth may be almost equal such that the spectrum shaping filter can be symmetric. The spectrum extension may be asymmetric also, which means, the additional bandwidth on each side of the allocated bandwidth may be of different sizes.

In an alternate embodiment, the transmitter or base station (BS) or gNB may indicate the user 2 parameters, i.e. usable BW where data is allocated and excess BW where shaping is allowed. The BS scheduler may take care of these 2 parameters per UE as part of the entire scheduling operations. The excess BW when symmetric can be assumed to have equal guard subcarriers on either side of the allocated spectrum. However, for asymmetric cases, an additional parameter which indicates the start location of the usable BW is indicated between UE and gNB. The spectrum extension factor depends on channel properties, allocation size, modulation order, coding rate, and RS, CP lengths. Pi/2-BPSK modulation is a special case, where spectrum extension may not be needed. A spectrum shaping is performed on the spectrum extended data by multiplying with the frequency response of the spectrum shaping filter. The spectrum shaped data can be given by, $$X_{ss}(k)=W(k)X_{exs}(k)$$

Figure 14:
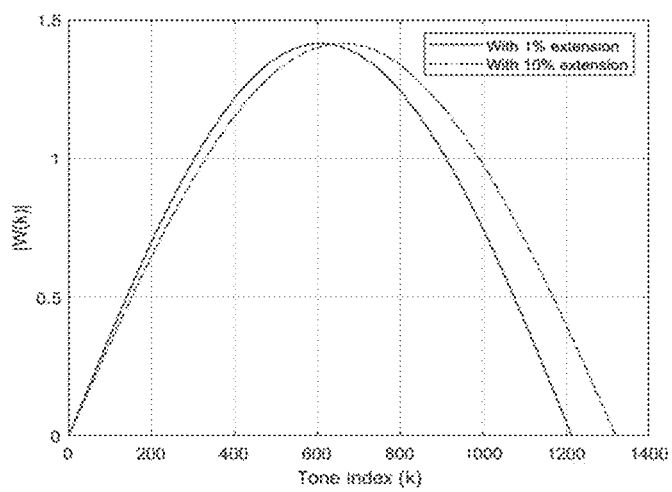
FIG. 14 shows a frequency response of 2-tap filter obtained from over sampling of LGMSK filter.
Figure 15:
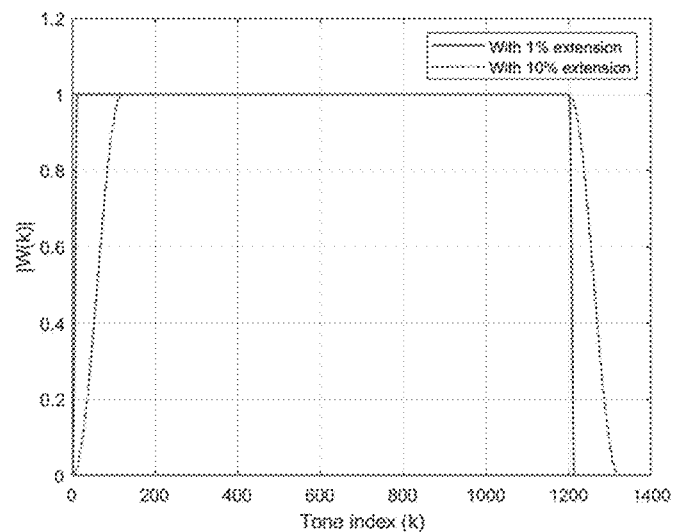
FIG. 15 shows a plot illustrating frequency response of raised cosine filter.
Figure 16:
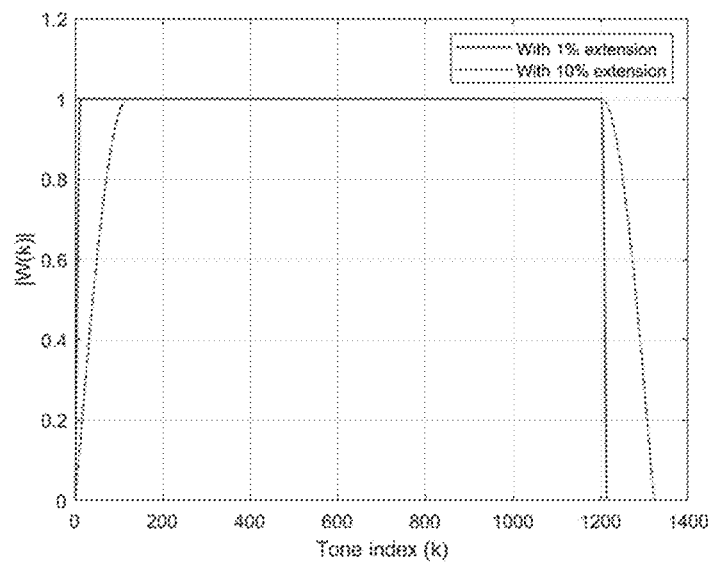
FIG. 16 shows a plot illustrating frequency response of square root raised cosine filter.

The filter W(k) is a frequency response of square root raise cosine, raised cosine, Hanning, Blackman or Hamming windows, or the filter can be an oversampled Linearized Gaussian Minimal Shifting Keying (LGMSK) filter. Otherwise, filter W(k) is the square root of the frequency response of the above-mentioned filters. The frequency response of some of the spectrum shaping filters are shown in FIGS. 14, 15, 16. The spectrum shaping filter either be specified by the base station or can be unknown at the base station. The spectrum shaping filter may be specified in specifications explicitly or exchanged via signaling or specification transparent. The spectrum shaping filter may or may not have zeros at the end, if it has zeros, it may be at the beginning, or at the end, or at the edges.

FIG. 14 shows a plot illustrating frequency response of 2-tap filter obtained from over sampling of LGMSK filter. FIG. 15 shows a plot illustrating frequency response of raised cosine filter. FIG. 16 shows a plot illustrating frequency response of square root raised cosine filter. When spectrum extension factor 'd' is zero, spectrum extension may not be performed. The spectrum shaping is performed either in time-domain by circular convolving the data-RS multiplexed symbol with impulse response of the spectrum shaping filter or in frequency domain, where the DFT-precoded symbol is simply multiplied with the frequency response of the spectrum shaping filter. The spectrum shaping helps in reduction of PAPR, which eventually results in better power efficiency.

Figure 17A:
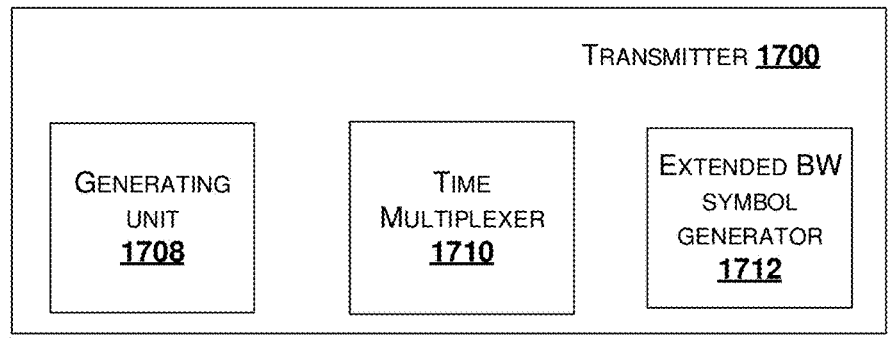
FIG. 17A shows a block diagram of a transmitter in a communication network, in accordance with an embodiment of the present disclosure.

FIG. 17A shows a block diagram of a transmitter in a communication network, in accordance with an embodiment of the present disclosure. The transmitter 1700 generates a waveform for transmission.

As shown in FIG. 17A, the transmitter 1700 comprises a processor, and memory coupled with the processor (not shown in the figure). The transmitter may be referred as a communication system. The processor may be configured to perform one or more functions of the transmitter for communication in the communication network. In one implementation, the transmitter 1700 may comprise blocks 1706, also referred as modules or units 1706 for performing various operations in accordance with the embodiments of the present disclosure. In an embodiment, the transmitter 1700 comprises a plurality of antennas (not shown in the Figure).

The unit or block 1706 includes a generating unit 1708, a time multiplexer 1710 and an extended bandwidth (BW) symbol generator 1712. The generating unit 1708 generates at least one of: at least one data sequence and at least one reference sequence (RS). The at least one data sequence is one of a pi/2 binary phase shift keying (BPSK) sequence, a BPSK sequence, a Quadrature Phase Shift Keying (QPSK) sequence, M-ary Quadrature Amplitude Modulation (QAM) sequence, and an M-ary Phase Shift Keying (PSK) sequence. In an embodiment, the at least one data sequence includes at least one of a user data and a control information. Each of the at least one data sequence includes at least one data, and at least one of a data cyclic prefix and a data cyclic suffix.

The at least one RS is one of a pi/2 binary phase shift keying (BPSK) sequence, a BPSK sequence, a Zadoff-Chu (ZC) sequence, a Quadrature Phase Shift Keying (QPSK) sequence, and a M-ary Phase Shift Keying (PSK) sequence.

In an embodiment, each of the at least one RS sequence includes at least one RS chunk, at least one of a RS cyclic prefix and a RS cyclic suffix, size of the RS cyclic prefix is one of at least half of the RS chunk size and an arbitrary value, size of the RS cyclic suffix is one of at least half of the RS chunk size and an arbitrary value. The arbitrary value is 0 or ¼th of RS chunk size or any other value which may be pre-defined in specification or explicitly signalled between transmitter or receiver or implicitly understood based on the size of the RS.

In an embodiment, when the at least one data and at least one RS sequence are pi/2-BPSK sequence, then the multiplexed sequence is rotated by 90 degrees between successive elements of the multiplexed sequence to generate a rotated multiplexed sequence.

Figure 17B:
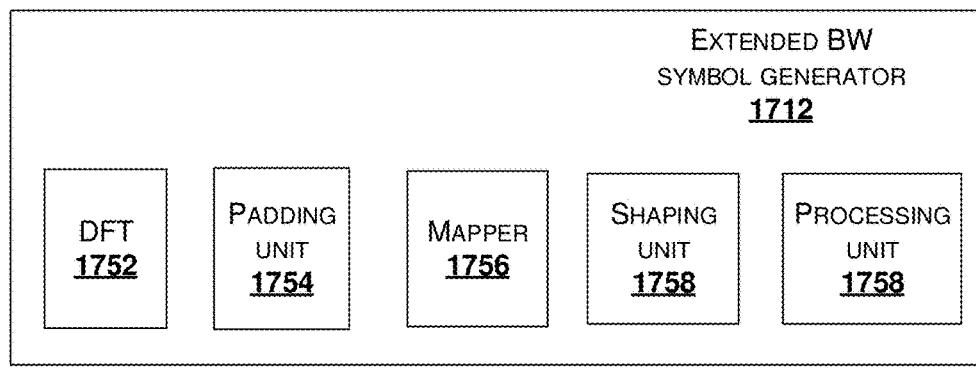
FIG. 17B shows a block diagram of extended BW symbol generator, in accordance with an embodiment of the present disclosure.

The time multiplexer 1710 performed time-multiplexing of the at least one data sequence with the at least one RS, to generate a multiplexed sequence. The extended bandwidth (BW) symbol generator 1712 generates a filtered-extended bandwidth DFT-s-OFDM symbol using the multiplexed sequence. FIG. 17B shows a block diagram of extended BW symbol generator, in accordance with an embodiment of the present disclosure. In an embodiment, the filtered-extended bandwidth DFT-s-OFDM symbol includes a plurality of RS chunks, wherein size of the plurality of RS chunks is different. In an embodiment, the filtered-extended bandwidth DFT-s-OFDM symbol includes a plurality of RS chunks, wherein the size of the plurality of RS chunks is same.

In an embodiment, a filtered-extended bandwidth DFT-s-OFDM full RS symbol is generated for the multiplexed sequence comprising of at least one RS sequence. Similarly, a filtered-extended bandwidth DFT-s-OFDM full data symbol is generated for the multiplexed sequence comprising of at least one data sequence.

As shown in FIG. 17B, the extended BW symbol generator 1712 comprises a Discrete Fourier Transform (DFT) unit 1752, a padding unit 1754, a mapper 1756, a shaping unit or a filter 1758 and a processing unit 1760.

The DFT 1752 transforms the multiplexed sequence received from the time multiplexer 1710 using a Discrete Fourier Transform (DFT) to generate a transformed multiplexed sequence.

The padding unit performs padding operation on the transformed multiplexed sequence i.e. prefixing the transformed multiplexed sequence with a first predefined number (N1) of subcarriers and post-fixing the transformed multiplexed sequence with a second predefined number (N2) of subcarriers to obtain an extended bandwidth transformed multiplexed sequence. The value of the N1 is at least zero, and value of the N2 is at least zero. The values of N1 and N2 may be same or different. The value of N1 and N2 may depend on the excess power that is sent by the transmitter. In an embodiment, the transmitter is user equipment (UE) or base station (BS).

The mapper 1756, also referred as a sub carrier mapper or mapping unit or subcarrier mapping unit, performs subcarrier mapping on the extended bandwidth transformed multiplexed sequence with at least one of localized and distributed subcarriers to generate a mapped extended bandwidth transformed multiplexed sequence. In an embodiment, the distributed subcarrier mapping includes insertion of zeros in to the extended bandwidth transformed multiplexed sequence.

The shaping unit 1758, also referred as a filter, performs shaping of the mapped extended bandwidth transformed multiplexed sequence to obtain a shaped extended bandwidth transformed multiplexed sequence. The filter used for the shaping operation on the extended bandwidth transformed multiplexed sequence is one of a Nyquist filter, square root raised cosine filter, a raised cosine filter, a hamming filter, a Hanning filter, a Kaiser filter, an oversampled GMSK filter and any filter that satisfies predefined spectrum characteristics.

The processing unit 1758 performing an Inverse Fast Fourier Transform (IFFT) on the shaped extended bandwidth transformed multiplexed sequence to produce a time domain sequence and processing the time domain sequence to generate the filtered-extended bandwidth DFT-s-OFDM symbol. The processing of the time domain sequence to generate a filtered-extended bandwidth DFT-s-OFDM symbol comprises performing at least one of addition of symbol cyclic prefix, addition of symbol cyclic suffix, windowing, weighted with overlap and add operation (WOLA), and frequency shifting on the time domain waveform, to generate the filtered-extended bandwidth DFT-s-OFDM symbol.

In an embodiment, the generated filtered-extended bandwidth DFT-s-OFDM symbol transmission is a single shot transmission comprising at least one RS sequence, and at least one of data and control sequence and the said RS sequence is used to demodulate the said data or control sequence.

The transmission of the waveform being generated is being facilitated using a slot. The slot comprises a plurality of OFDM symbols, said plurality of OFDM symbols includes at least one of: at least one filtered-extended bandwidth DFT-s-OFDM symbol comprising of RS and data, at least one filtered-extended bandwidth DFT-s-OFDM symbol comprising of full RS, and at least one filtered-extended bandwidth DFT-s-OFDM symbol comprising of full data. The plurality of OFDM symbols includes at least one of a filtered-extended bandwidth DFT-s-OFDM symbol comprising of RS and data is filtered using a first filter, filtered-extended bandwidth DFT-s-OFDM symbol comprising of RS is filtered using a second filter, filtered-extended bandwidth DFT-s-OFDM symbol is filtered using a third filter, said filter have one on one correspondence among each other. The coefficients of the filters are the same.

In an embodiment, the at least one RS is placed at one of starting position of the multiplexed sequence, ending position of the multiplexed sequence, at both the starting position and ending position of the multiplexed sequence, and at centre position of the multiplexed sequence.

The plurality of OFDM symbols includes at least one of a filtered-extended bandwidth DFT-s-OFDM symbol comprising of RS and data is filtered using a first filter, filtered-extended bandwidth DFT-s-OFDM symbol comprising of RS is filtered using a second filter, filtered-extended bandwidth DFT-s-OFDM symbol is filtered using a third filter, said filter have one on one correspondence.

Figure 18:
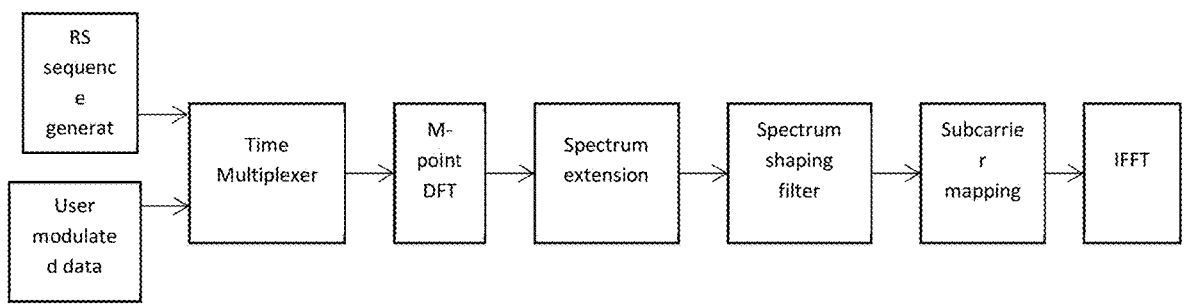
FIG. 18 shows a block diagram of transmitter illustrating multiplexing of data and RS in one OFDM symbol, with excess bandwidth and spectrum shaping.

FIG. 18 shows a block diagram of transmitter illustrating multiplexing of data and RS in one OFDM symbol, with excess bandwidth and spectrum shaping. The spectrum shaped data is mapped on to the subcarriers allocated to the user, followed by an IFFT of size N to generate an OFDM waveform. Overall transmitter structure with spectrum extension is shown in FIG. 18, and without extension are shown in FIGS. 19A and 19B.

Figure 19A:
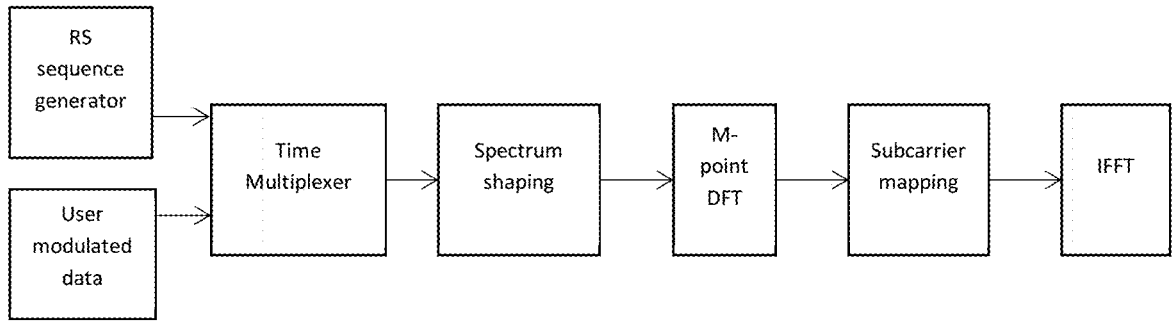
FIG. 19A shows a block diagram of transmitter illustrating multiplexing of Data and RS in one OFDM symbol, with spectrum shaping in time-domain and without excess bandwidth.
Figure 19B:
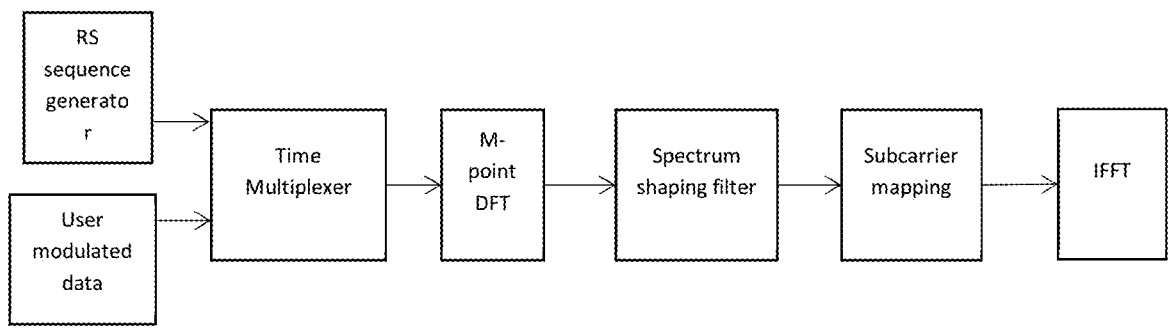
FIG. 19B shows a block of a transmitter illustrating multiplexing of Data and RS multiplexed in one OFDM symbol, with spectrum shaping in frequency-domain and without excess bandwidth.

FIG. 19A shows a block diagram of transmitter illustrating multiplexing of Data and RS in one OFDM symbol, with spectrum shaping in time-domain and without excess bandwidth. FIG. 19B shows a block of a transmitter illustrating multiplexing of Data and RS multiplexed in one OFDM symbol, with spectrum shaping in frequency-domain and without excess bandwidth.

Figure 20:
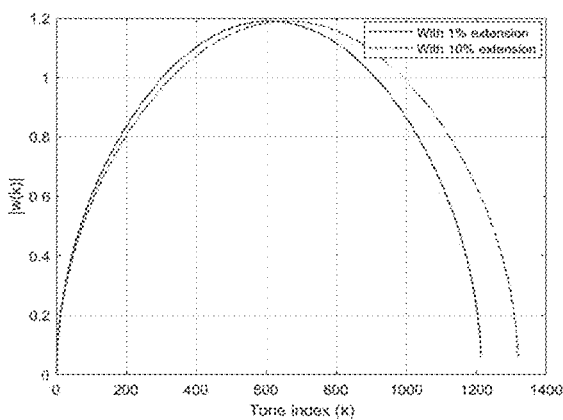
FIG. 20 shows a plot illustrating magnitude of square root of Frequency response of 2-tap filter obtained from over sampling of LGMSK filter.
Figure 21:
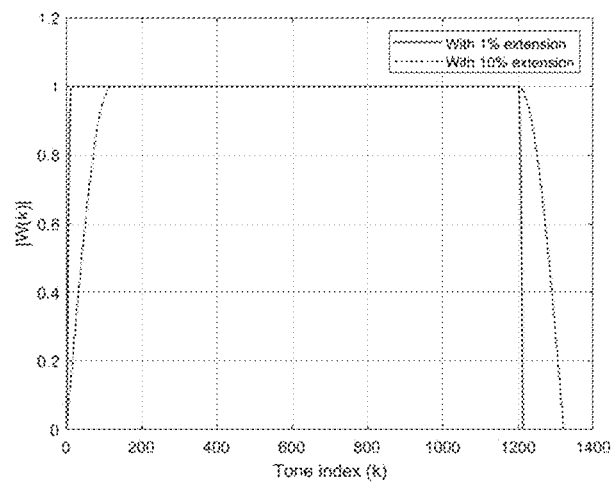
FIG. 21 shows a plot illustrating magnitude of square root of frequency response of raised cosine filter.
Figure 22:
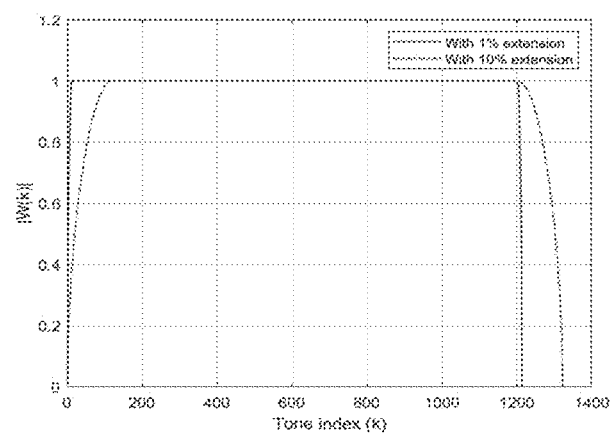
FIG. 22 shows a plot illustrating magnitude of square root of frequency response of square root raised cosine filter.

FIG. 20 shows a plot illustrating magnitude of square root of Frequency response of 2-tap filter obtained from over sampling of LGMSK filter. FIG. 21 shows a plot illustrating magnitude of square root of frequency response of raised cosine filter. FIG. 22 shows a plot illustrating magnitude of square root of frequency response of square root raised cosine filter.

Figure 23:
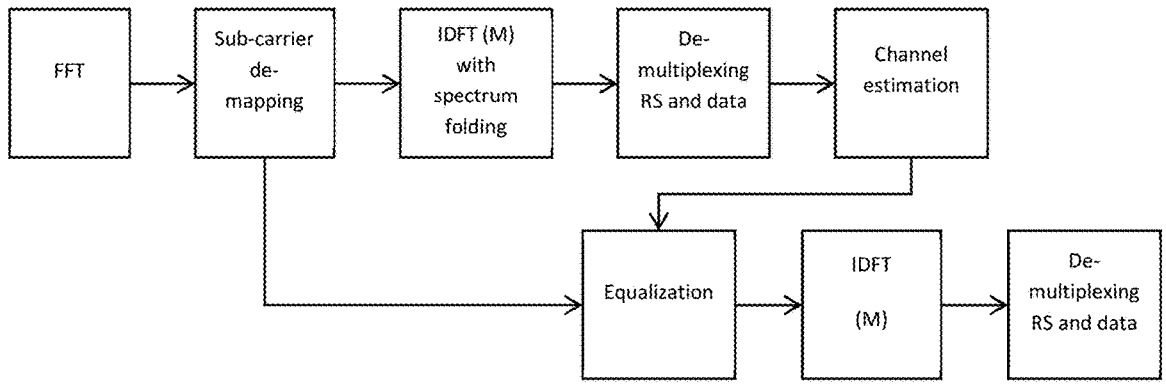
FIG. 23 shows a block diagram of a receiver for Data and RS multiplexed in one OFDM symbol, with spectrum shaping and excess bandwidth.

FIG. 23 shows a block diagram of a receiver for receiving data and RS being multiplexed in one OFDM symbol, with spectrum shaping and excess bandwidth, in accordance with an embodiment of the present disclosure. As shown in FIG. 23, the received signal is first processed with front processing elements like ADC, CP removal and FFT. The allocated sub-carriers are de-mapped in the sub-carrier de-mapper, where M+d allocated sub-carriers are de-mapped from entire FFT output. If spectrum shaping performed at the transmitter is with square root of the frequency response of the spectrum shaping filter and filter is known at the receiver, then de-mapped "M+d" subcarriers are multiplied with the same filter used at the transmitter before further processing. This helps in maximizing the receiver SNR. If the filter is not known at the receiver, then the de-mapped data is processed without any receiver shaping. The filter used at the receiver can be called as subcarrier filters. The subcarrier filters may be one of SQRC, RC, Hanning, Hamming, Blackman, or LGMSK filters, or square root of these filters. The frequency spectrum of some of the subcarrier filters are shown in FIGS.

20, 21, 22. The subcarrier filter may or may not have zeros at the end, if it has zeros, it may be at the beginning, or at the end, or at the edges.

In an embodiment, the receiver receives a waveform generated by the transmitter as shown in FIGS. 17A, 18, 19A and 19B. The receiver processing the received waveform to detect a data of interest. The method comprises a channel estimation using at least one reference sequence (RS) in the received waveform, wherein said channel estimation is used to detect at least one of a data and a control sequence of interest. The received waveform is being facilitated using a slot, said slot comprises a plurality of OFDM symbols, said plurality of OFDM symbols includes at least one of: a at least one filtered-extended bandwidth DFT-s-OFDM symbol comprising of RS and data, at least one filtered-extended bandwidth DFT-s-OFDM symbol comprising of full RS, and at least one filtered-extended bandwidth DFT-s-OFDM symbol comprising of full data.

The receiver uses at least one of: one or more filtered-extended bandwidth DFT-s-OFDM full RS symbols, one or more filtered-extended bandwidth DFT-s-OFDM symbol comprising RS sequence and a data sequence for channel estimation and equalization. Further, the receiver uses at least one of: one or more filtered-extended bandwidth DFT-s-OFDM full RS symbols, one or more filtered-extended bandwidth DFT-s-OFDM symbols comprising at least one RS and at least one data sequence for phase tracking. The receiver method depends on slot transmitted by the transmitter.

The receiver uses at least one of: one or more filtered-extended bandwidth DFT-s-OFDM RS symbols, one or more filtered-extended bandwidth DFT-s-OFDM symbol comprising at least one RS and at least one data sequence for channel tracking over time and equalization of data using tracked channel.

The receiver processes the received waveform to detect data of interest. The processing comprising processing the received waveform by performing one of coherently adding an extended bandwidth and removal of an extended bandwidth from the received waveform, to obtain a processed sequence; estimating the channel from the processed sequence using an estimation method to obtain an estimated channel; equalizing the extended bandwidth sequence using the estimated channel to obtain an equalized sequence.

Also the method comprises, performing an Inverse Discrete Fourier Transform (IDFT) on the equalized sequence to generate a time domain signal, de-multiplexing the time domain signal to obtain at least one of a reference sequence and a data sequence. The processing the received waveform to detect data of interest comprising: filtering the received waveform using a subcarrier filter to obtain a filtered received sequence, processing the filtered received sequence by performing one of coherently adding an extended bandwidth to the received waveform and removal of an extended bandwidth from the received waveform, to obtain a processed sequence, estimating the channel acted on the processed sequence using an estimation method to obtain an estimated channel, equalizing the extended bandwidth processed sequence using the estimated channel to obtain an equalized sequence and performing an Inverse Discrete Fourier Transform (IDFT) on the equalized sequence to generate a time domain signal; and de-multiplexing the time domain signal to obtain at least one of a reference sequence and a data sequence.

The subcarrier filter is an arbitrary chosen filter or match to the shaping filter used in the transmitter. The processing step depends on at least one of a RS cyclic prefix and a RS cyclic suffix. The method for receiving a waveform, comprising: performing, by the receiver, a Fast Fourier Transform (FFT) on received time multiplexed waveform to obtain a transformed sequence, performing de-mapping operation, by the receiver, on the transformed sequence using a plurality of sub-carriers to generate a de-mapped sequence; estimating, by the receiver, a channel using the de-mapped sequence based on an estimation method; and equalizing, by the receiver, the de-mapped sequence using the estimated channel to obtain an equalized sequence.

The mapping comprising de-modulating the transformed multiplexed signal using one of pi/2 Binary Phase Shift Keying (BPSK), Quadrature Phase Shift Keying (QPSK), and Quadrature Amplitude Modulation (QAM). The method comprises performing an Inverse Discrete Fourier Transform (IDFT) on the equalized sequence to generate a time domain sequence; and de-multiplexing the time domain sequence to obtain at least one of a reference sequence (RS) and a data sequence. The method comprising performing an inverse FFT on the de-mapped sequence to obtain time domain de-mapped sequence; and de-multiplexing the time domain de-mapped sequence to obtain at least one of a RS sequence and at least one of a data sequence.

The spectrum shaping filter used by the transmitter and receiver are the same and is indicated (or pre-determined/a priori agreed) between the UE and BS. One example of such a filter is square root raised cosine filter which is applied in the frequency domain (in both Tx and Rx sides).

From M+d size de-mapped data Y(k), M samples can be obtained in two identical methods. In the first method, M samples are obtained from M+d samples by taking modified IDFT of size M, which can be given by the following expression.

$$\tilde{Y}(k) = \frac{1}{\sqrt{M}} \sum_{k=0}^{M+d-1} Y(k) e^{\frac{j2\pi\left(k-\frac{d}{2}\right)n}{M}}$$

OR $$\tilde{Y}(k) = \frac{1}{\sqrt{M}} \sum_{k=0}^{M+d-1} Y(k) e^{\frac{j2\pi(k-K)n}{M}}$$

The second method, which is equivalent to the above expression involves the following steps.

From the de-mapped data Y(k), central M-subcarriers are collected and labelled as $Y_1(k)$.

The de-mapped data is left shifted by M-subcarriers to collect central M-subcarriers which is labelled as $Y_2(k)$.

The de-mapped data is right shifted by M-subcarriers to collect central M-subcarriers which is labelled as $Y_3(k)$.

Figure 24:
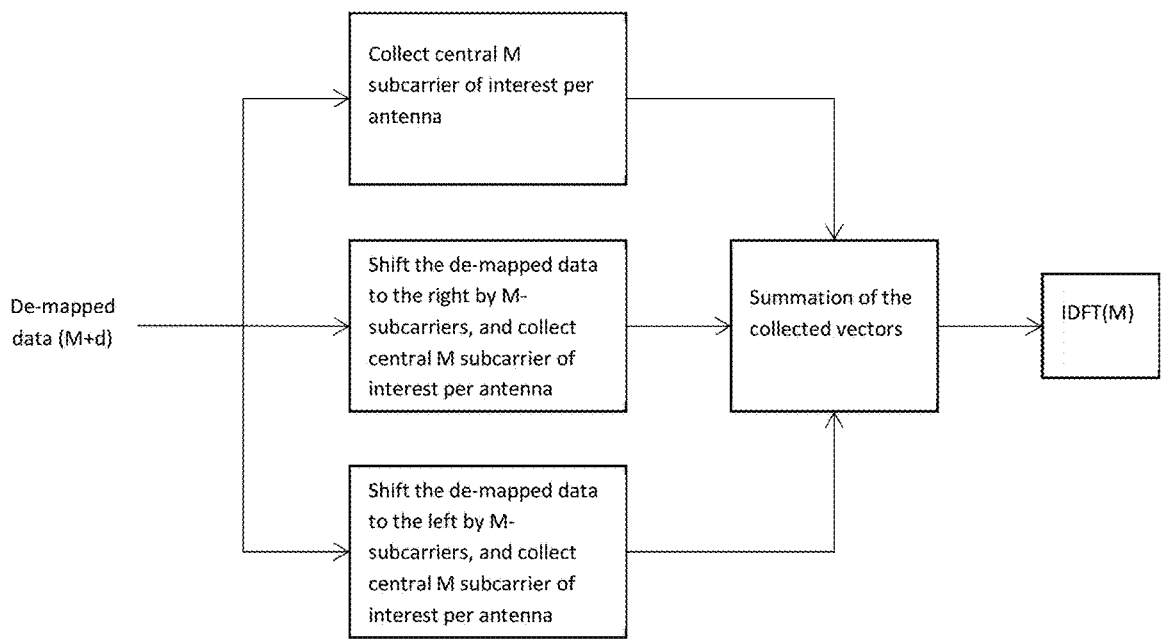
FIG. 24 shows an illustration of obtaining M samples from M+d samples at the receiver.

Effective received data of size M is obtained by adding all the above collected data. The effective data can be given by $\tilde{Y}(k) = Y_1(k) + Y_2(k) + Y_3(k)$ This procedure is encapsulated in FIG. 24. In cases where the excess number of subcarriers is more than M, additional circularly shifted components (2M, 3M etc.) will be included in the above expression. FIG. 24 shows an illustration of obtaining M samples from M+d samples at the receiver.

Figure 25:
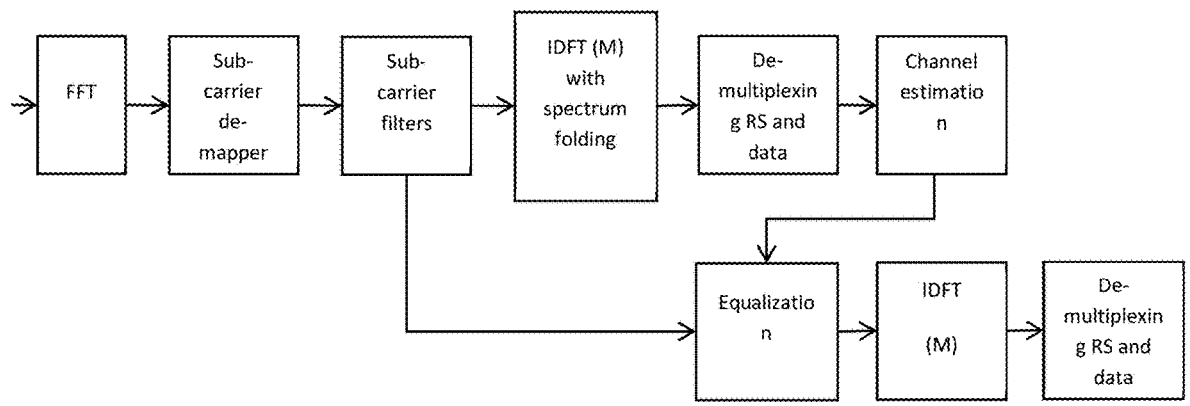
FIG. 25 shows a receiver block diagram for receiving data and RS multiplexed in one OFDM symbol with spectrum extension shaping and receiver spectrum shaping.

An IDFT of size M is taken over the effective data $\tilde{Y}(k)$ to obtain the received data in time-domain, where Data and RS are de-multiplexed. The received RS samples are used for channel estimation. Estimation may be performed by Least Squares method, or Least Squares followed by time-domain interpolation or using an MMSE based estimation, or using time domain DFT based channel estimation. The estimated channel obtained from RS will be used for equalizing the de-mapped data of size M using an equalizer like MMSE or ZF, or MF, or IRC based equalizers. An IDFT of size M is performed on the equalized data to obtain multiplexed RS and data in time-domain. User data is de-multiplexed and sent for further processing. The receiver architecture for this is as shown in FIG. 23. The receiver architecture for receiver filtering is as shown in FIG. 25. If spectrum extension is not performed at the transmitter, An IDFT of size M is performed on the de-mapped without any intermediate processing.

FIG. 23 shows a block diagram of a receiver for receiving Data and RS multiplexed in one OFDM symbol, with spectrum shaping and excess bandwidth. FIG. 24 shows an illustration of obtaining M samples from M+d samples at the receiver. FIG. 25 shows a receiver receiving for Data and RS multiplexed in one OFDM symbol with spectrum extension shaping and receiver spectrum shaping.

Figure 26:
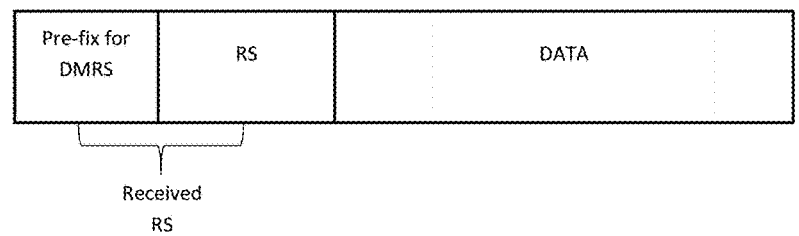
FIG. 26 shows pre-DFT symbol with RS having only pre-fix along with received RS representation.

If the RS chunk has only Cyclic prefix, unlike the processing of RS with both pre-fix and post-fix, the RS de-multiplexed at the receiver for channel estimation is sampled inside the pre-fix as shown in FIG. 26. The offset in picking of RS samples can be minimum of zero to maximum of length of cyclic prefix. With this proposed sampling, an exponential shift is observed on the estimated frequency domain channel. This offset may be cancelled out if per tone equalization is performed, otherwise, the offset may be corrected or absorbed into the timing offset if timing offset estimation is performed.

Figure 27:
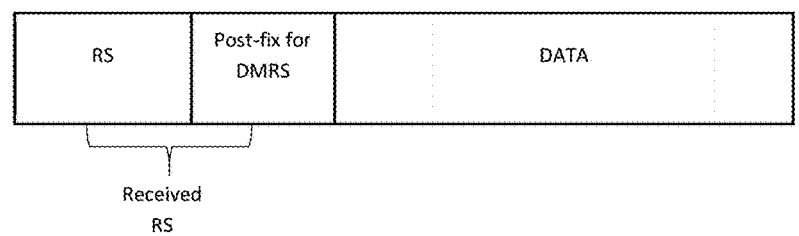
FIG. 27 shows pre-DFT symbol with RS having only post-fix along with received RS representation.

Similarly, if the RS chunk has only Cyclic suffix or cyclic postfix, the RS de-multiplexed at the receiver for channel estimation is sampled inside the RS as shown in FIG. 27. The offset in picking of RS samples can be minimum of zero to maximum of length of cyclic postfix or cyclic suffix. With this sampling, an exponential shift is observed on the estimated frequency domain channel. This offset cancels out if per tone equalization is performed, otherwise, the offset is corrected or absorbed into the timing offset if timing offset estimation is performed.

Figure 28:
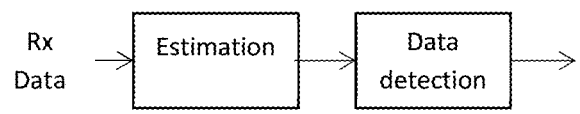
FIG. 28 shows a block diagram of a receiver for estimation and data detection.

FIG. 28 shows a receiver for receiving the received data, where, estimation may be performed using one of the transmitted RS, which may be at least one of filtered-extended bandwidth DFT-s-OFDM symbol comprising RS and data and filtered-extended bandwidth DFT-s-OFDM symbol comprising full RS. The estimated channel may be used for detection of data on interest.

Figure 29:
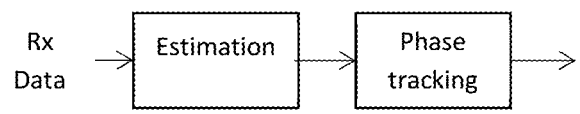
FIG. 29 shows a block diagram of a receiver for estimation and phase tracking.

FIG. 29 shows a receiver for receiving the received data, where, estimation may be performed using one of the transmitted RS, which may be at least one of filtered-extended bandwidth DFT-s-OFDM symbol comprising RS and data, and filtered-extended bandwidth DFT-s-OFDM symbol comprising full RS, filtered-extended bandwidth DFT-s-OFDM symbol comprising full data and carrying smaller RS also. The smaller RS may be used for phase tracking.

Figure 30:
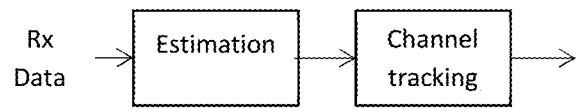
FIG. 30 shows a block diagram of a receiver for estimation and channel tracking.

FIG. 30 shows a receiver for receiving the received data, where, estimation may be performed using one of the transmitted RS, which may be at least one of filtered-extended bandwidth DFT-s-OFDM symbol comprising RS and data, and filtered-extended bandwidth DFT-s-OFDM symbol comprising full RS, filtered-extended bandwidth DFT-s-OFDM symbol comprising full data and carrying smaller RS also. The smaller RS may be used for channel tracking.

Figure 31:
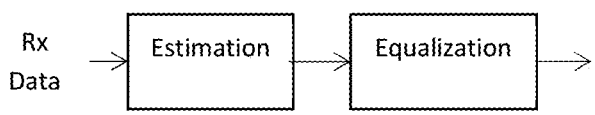
FIG. 31 shows a block diagram of a receiver for estimation and equalization.

FIG. 31 shows a receiver for receiving the received data, where, estimation may be performed using one of the transmitted RS, which may be at least one of filtered-extended bandwidth DFT-s-OFDM symbol comprising RS and data, and filtered-extended bandwidth DFT-s-OFDM symbol comprising full RS, filtered-extended bandwidth DFT-s-OFDM symbol comprising full data. The estimated channel may be used to equalize the received data.

Figure 32:
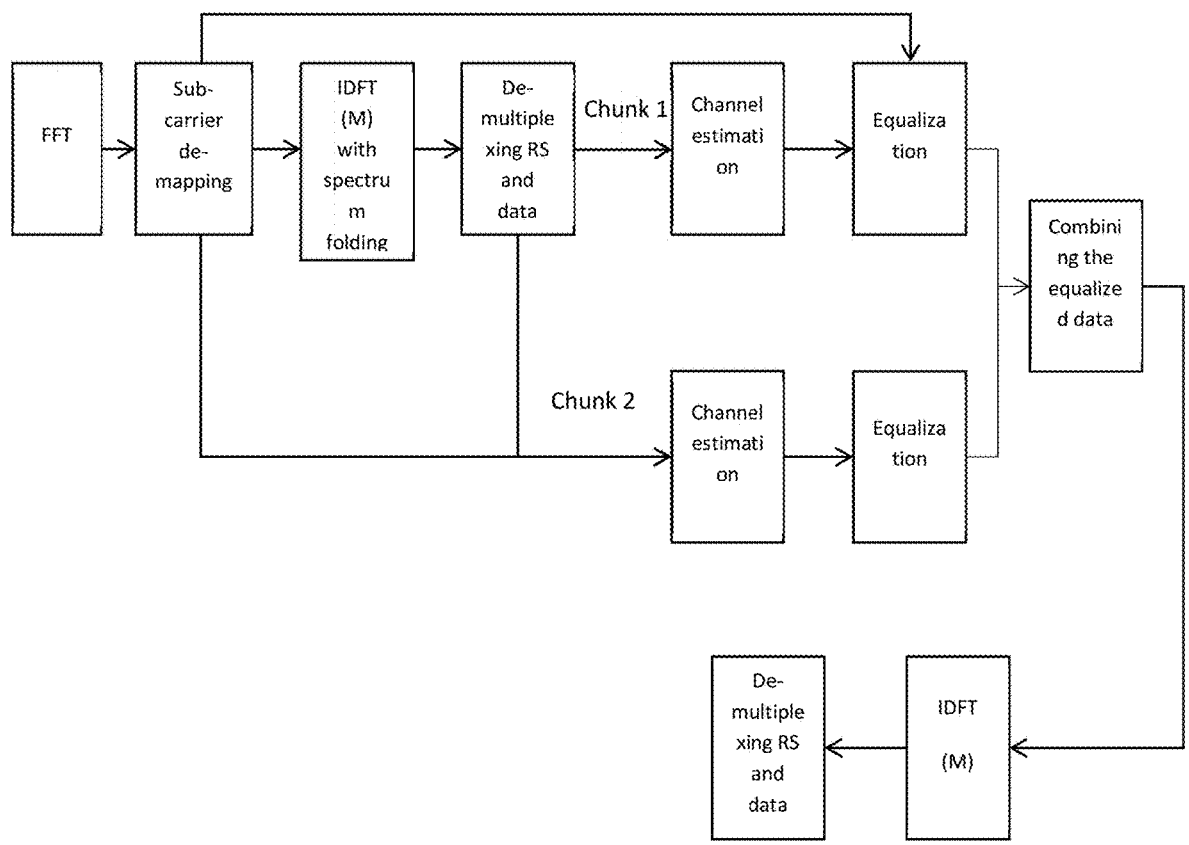
FIG. 32 shows a block diagram of a receiver for two RS chunks, with estimation on each RS chunk, in accordance with another embodiment of the present disclosure.

FIG. 32 shows a receiver for receiving two RS chunks, with estimation on each RS chunk. When a multiple RS chunks with CP are transmitted, channel estimation is performed on all the transmitted RS chunks. The estimated channel on each chunk will be used for equalizing the user data transmitted adjacent to that. The receiver architecture is as shown in FIG. 32.

Figure 33:
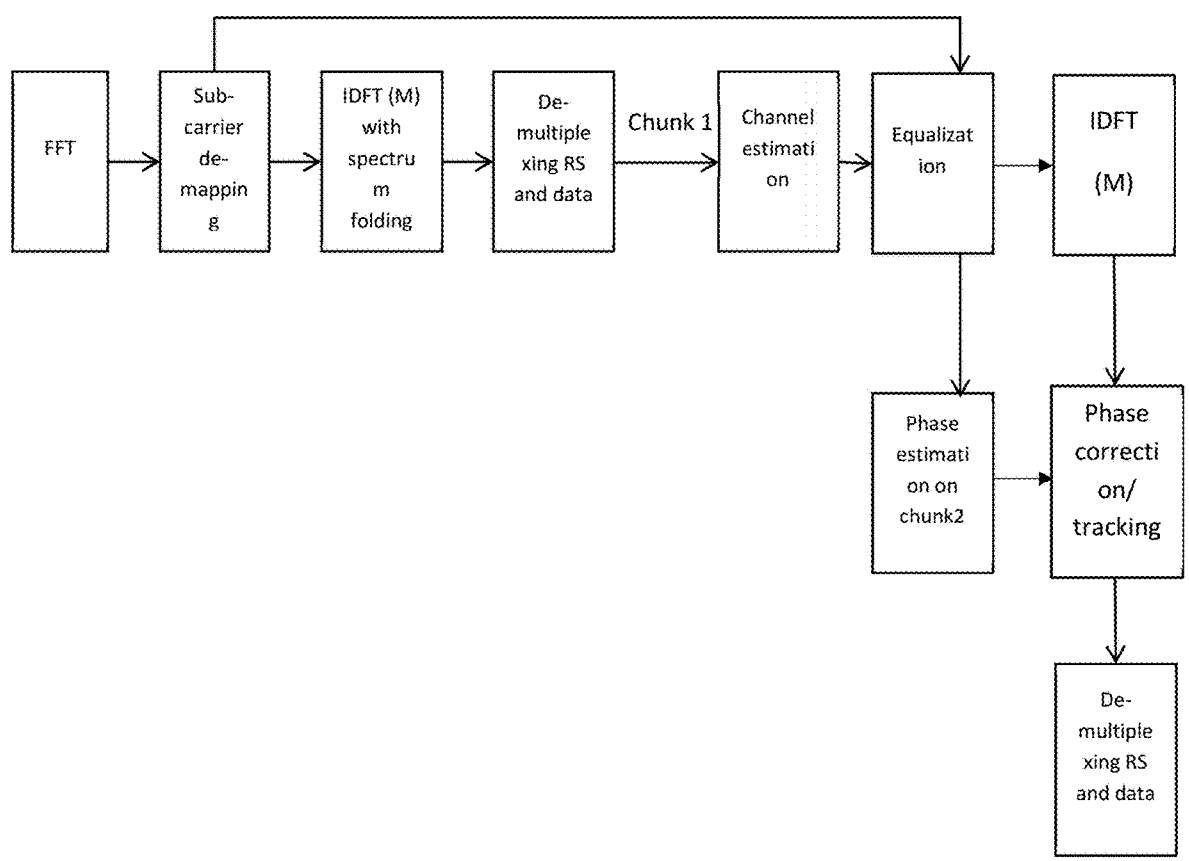
FIG. 33 shows a block diagram of a receiver for two RS chunks, with phase estimation on secondary RS chunk, in accordance with an embodiment of the present disclosure.

As shown in FIG. 32, the receiver architecture is for two chunks; however, it can be extended for any number of chunks. When multiple chunks of different sizes are transmitted, the chunk with larger size will be used for channel estimation, which will be used for data equalization. The smaller chunks are used to estimate any phase changes in the equalized data. The receiver architecture for this is as shown in FIG. 33. The receiver architecture is for two chunks; however, it can be extended for any number of chunks. FIG. 33 shows a receiver for receiving two RS chunks, with phase tracking or estimation on secondary RS chunk.

Figure 34:
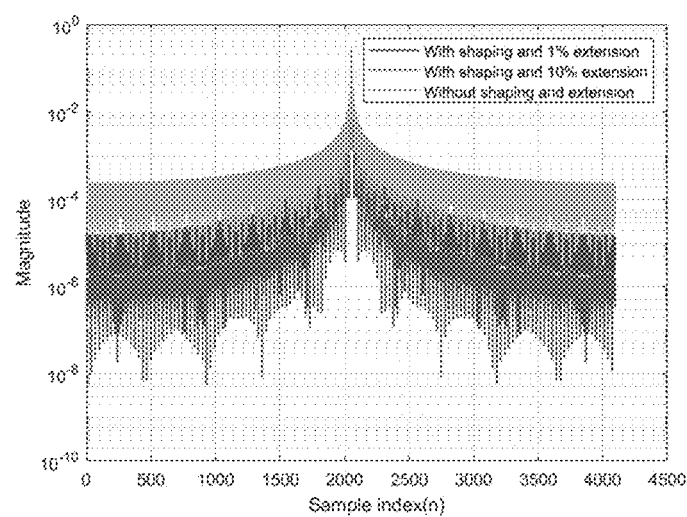
FIG. 34 shows a plot illustrating an effective channel on the OFDM symbol post CP removal at the receiver.
Figure 35:
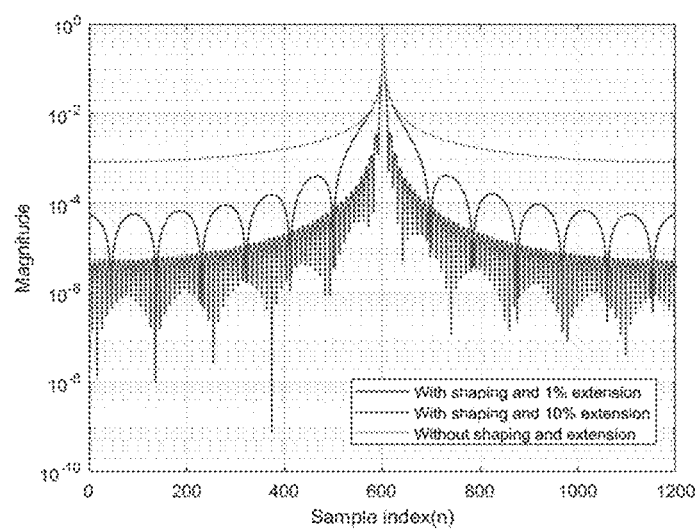
FIG. 35 shows a plot illustrating an effective channel on the OFDM symbol post IDFT at the receiver.

One embodiment of the present disclosure is results in AWGN delay channel (timing error). FIG. 34 shows a plot illustrating an effective channel on the OFDM symbol post CP removal at the receiver. FIG. 35 shows a plot illustrating an effective channel on the OFDM symbol post IDFT at the receiver.

FIGS. 34 and 35 shows the effective time channel on the OFDM symbol post CP removal and post IDFT at the receiver. The effective channel is without shaping, and with SQRC shaping. From the figures, it can be inferred that, without spectrum shaping the channel energy is spread over the entire allocation. While with shaping the energy starts getting concentrated around the main lobe. Additionally, with increase in the excess bandwidth, the length of the spectrum shaping filter increases, which eventually results in more concentration of energy in the main lobe. Hence, with the decrease in the side lobes energy, there will be less leakages of data on to RS, and a lesser number of RS samples will be needed for perfect channel estimation compared to without shaping.

Figure 36:
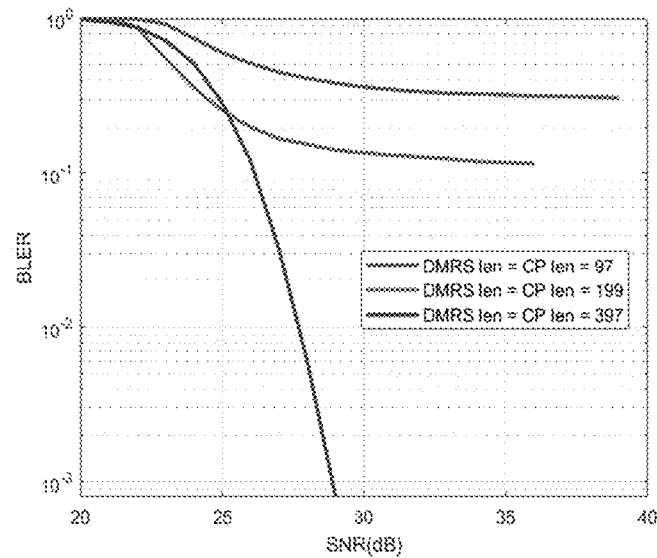
FIG. 36 shows a plot illustrating BLER performance comparison in delay 1/1200 channel, without spectrum extension and shaping with different RS CP lengths.

FIG. 36 shows an illustration of BLER performance of Pre-DFT RS and data multiplexing without spectrum extension and shaping for allocation of 1200 subcarriers in one sample delay channel. Since, without spectral extension and shaping, there are significant channel taps on all the time domain samples. Hence, BLER performance highly depends on the RS+CP length, with increase in RS sizes, the number of channel taps that can be collected increase. This eventually results in better of BLER performance Similar effect can be seen from the FIG. 36, where, with lesser RS size, there is error floor. However, with increase in the RS and CP lengths, there is improvement in the BLER performance. No error floor is observed only when RS+CP lengths are almost the size of the allocation.

However, like explained previously, with spectrum shaping, the channel energy gets concentrated in the main lobe. Hence, the effect of shaping can be seen in the BLER performance as shown in FIG. 37. The FIG. 37 shows a plot illustrating BLER performance comparison in one sample delay channel, with and without spectrum extension and shaping. For a give RS and CP sizes, with extension and shaping, there is no error floor observed. Hence, the BLER performance is better compared to without extension and shaping.

FIG. 38 shows a plot illustrating BLER performance comparison in delay 5/1200 channel, with different spectrum extension values and same RS, CP lengths. As shown in FIG. 38, the BLER performance of proposed system in 5 samples delay channel with same RS, CP length and different spectrum extension factors. From FIGS. 34 and 35, it can be observed that, the channel concentration in the mail lobe depends on the spectrum extension factor. Hence, for a given channel and given RS lengths, larger the spectrum extension factor better will be the BLER performance compared to the lower extension values, which similar to performances shown in FIG. 38.

FIG. 39 shows a plot illustrating BLER performance comparison in delay 5/1200 channel, with same spectrum extension values and different RS, CP lengths. As shown in FIG. 39, the BLER performance of proposed system with same spectrum extension factor and different RS lengths. For a given extension factor, with increase in the RS size, more channel taps can be captured in the estimated channel, which results in better estimation and BLER performance. Hence, with RS size of 199 samples has better performance compared to RS size of 97 samples for the same spectrum extension factor of 2%.

FIG. 40 shows an effective channel on the OFDM symbol post CP removal at the receiver for TDL-C 100 nsec.

One embodiment of the present disclosure is results with TDL channel model.

FIG. 41 shows a plot illustrating an Effective channel on the OFDM symbol post IDFT at the receiver for TDL-C 100 nsec.

FIG. 42 shows a plot illustrating an Effective channel on the OFDM symbol post CP removal at the receiver for TDL-C 300 nsec.

FIG. 43 shows a plot illustrating an Effective channel on the OFDM symbol post IDFT at the receiver for TDL-C 300 nsec.

FIG. 44 shows a plot illustrating an BLER performance in TDL-C 100 nsec with 28% RS+CP OH for 1×1 and 2×1 systems and 256 QAM, R=0.89 (M=1200), 10% extension.

FIG. 45 shows a plot illustrating an BLER performance in TDL-C 300 nsec with 32% RS+CP OH for 1×1 and 2×1 systems and 256 QAM, R=0.89 (M=1200), 10% extension.

FIG. 46 shows a plot illustrating BLER performance in TDL-C 100 nsec with 20% RS+CP OH for 2×1 system and 256 QAM and R=0.89 with different FFT sizes (M=600), 10% extension.

FIG. 47 shows a plot illustrating an BLER performance in TDL-E 100 nsec with 28% RS+CP OH for 1×1 and 2×1 system and 256 QAM, R=0.89 with different FFT sizes (M=1200), 10% extension.

FIG. 48 shows a plot illustrating BLER performance in TDL-E 100 nsec with 28% RS+CP OH for 2×1 stem and 256 QAM, R=0.89 comparing SQRC and 2-tap filters (M=1200), 10% extension.

FIG. 49 shows a plot illustrating BLER performance in TDL-C 100 nsec with 21% RS+CP OH for 1×1 system and pi/2-BPSK modulation comparing true channel and estimated channel (M=1200), 10% extension.

FIGS. 40 and 41 shows the effective time domain channel after the CP removal and post IDFT at the receiver for TDL-C 100 nsec channel. It can be seen from the figures that the channel energy is getting concentrated at the mail lobe with increase in the spectrum shaping extension factor. Similarly, FIGS. 42, 43 shows the effective time domain channel after CP removal and post IDFT at the receiver for TDL-C 300 nsec channel Since TDL-C 300 nsec channel has more delay spread resulting in a greater number of timed domain dominant taps, more RS samples will be needed to estimate the channel with minimal error compared to the lower delay spread channels like TDL-C 100 ns. In FIG. 43, with increase in the spectrum extension factor, the energy gets into the mail lobe.

The number of channel taps that needs to be collected should bring the power of the ISI taps as low as possible, which may depend on the modulation order. For lower modulation orders, system may function even with higher ISI power. However, for higher modulation orders, ISI power from the excluded channel taps should be low for system to function. Hence, for Higher modulation order, the length of taps to be collected should be more. The length of RS depends on the number of taps that needs to collected. Hence, the RS size is modulation dependent and the number of taps to be collected. For example, from FIG. 41, which is the effective time domain channel on the allocated symbol for TDL-C 100 nsec, to operate the system less than −30 dB ISI about 150 RS samples with 10% extension may be needed, while to decrease the ISI power to less than 40 dB about 300 RS samples may be needed for channel estimation. Similarly, the length of each CP (post-fix and pre-fix) may be around half of the RS size that is used for estimation. This may ensure better channel estimation.

Similar to BLER performance analysis in Delay AWGN channel, BLER performance analysis of "pre-DFT RS and data multiplexing with spectrum shaping and extension" have been performed in TDL channels. Both LOS and NLOS channel with different delay spreads are considered for BLER analysis, where TDL-C is NLOS, and TDL-E is LOS. The number of channel taps in any channel model depends on the delay spread of the channel, higher the delay spread, higher will be the number of channel taps. Similarly, in TDL channel models, the number of channel taps depends on the delay spread. If the delay spread is high, a greater number of RS samples will be needed to estimate the channel Additionally, with larger delay spreads, there is possibility of more number of tones in deep null, which eventually deteriorates the BLER performance Or sometimes, error floor can also be observed. Hence, in single receive antenna TDL-C case, with the increase in the normalized delay spread from 100 nsec to 300 nsec, there is deterioration of BLER performance. However, with two receive antennas the performance with both the delay spreads are almost same. FIGS. 44, 45 shows the BLER performance of proposed system in TDL-C channel. Similarly, BLER performance for TDL-E 100 nsec for 1, and 2 receive antennas is shown in FIG. 47.

FIG. 46 shows the BLER performance of proposed system in NLOS channel with different FFT sizes. The user allocation size and the RS, CP allocations size are kept same across different FFT sizes. The effective time-domain channel on the received symbol post IDFT can be given by $$\tilde{h}(n') = \sum_{n=0}^{L-1} h(n) \sum_{k=0}^{M-1} e^{j2\pi k \left( \frac{n'}{M} - \frac{n}{N} \right)}$$

Where, L is the number of channel taps. M is the subcarriers allocated to the user. N is the FFT size. Here, with the increase in the FFT size (N), the effective number of taps (L) of the channel also increases. Hence, the energy of the channel for a given allocation for different FFT sizes will be same. This results in similar BLER performance irrespective of the FFT sizes.

FIG. 48 compares the BLER performance of the proposed system with SQRC shaping and oversampled GMSK filter. Compared to the frequency response of the SQRC filter, major taps of the LGMSK filter have magnitude less than 1. Hence, when such kind of filter is used for shaping the symbol, there will be increment in the noise power on equalized data. Therefore, the performance with SQRC shaping is better compared to the oversampled GMSK filter.

FIG. 49 shows the performance of the proposed system with pi/2-BPSK modulation without any spectral extension. Here, pi/2-BPSK modulation is modified version of BPSK modulation which has maximum separated distance between the modulated symbols. Hence, even without any spectral extension, there is no error floor in BLER performance. In this method, 2-tap filter [1 1]/sqrt (2), obtained from oversampling LGMSK filter is used to get the frequency response of the spectrum shaping filter.

Figure 50:
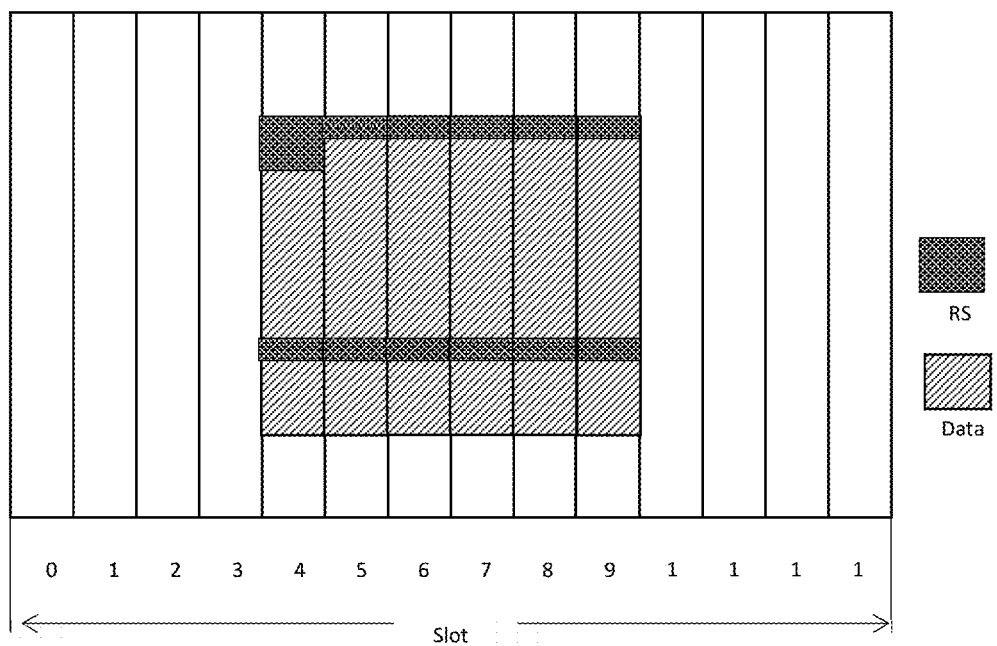
Figure 51:
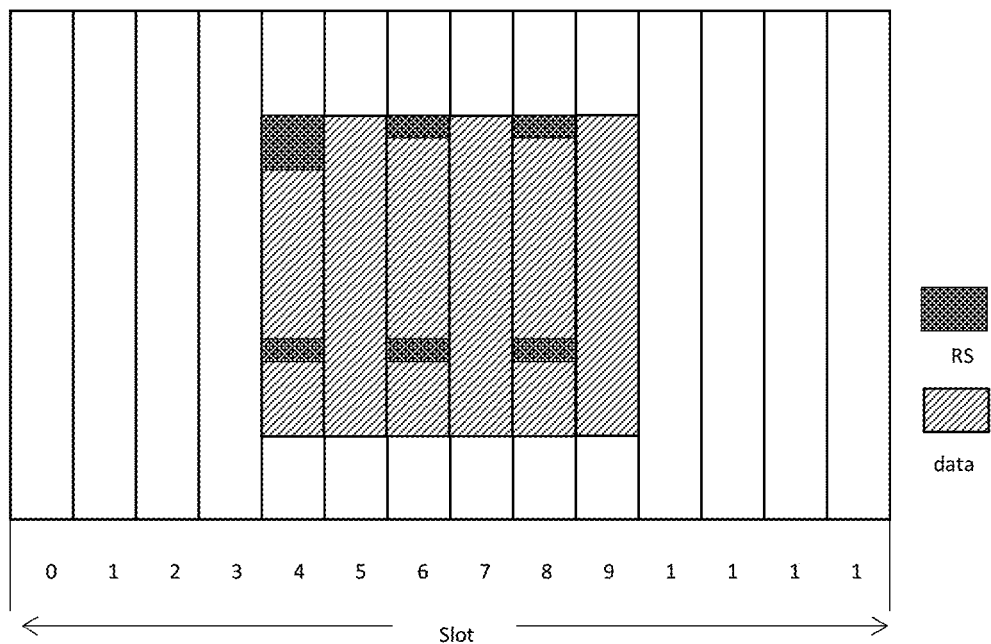
Figure 52:
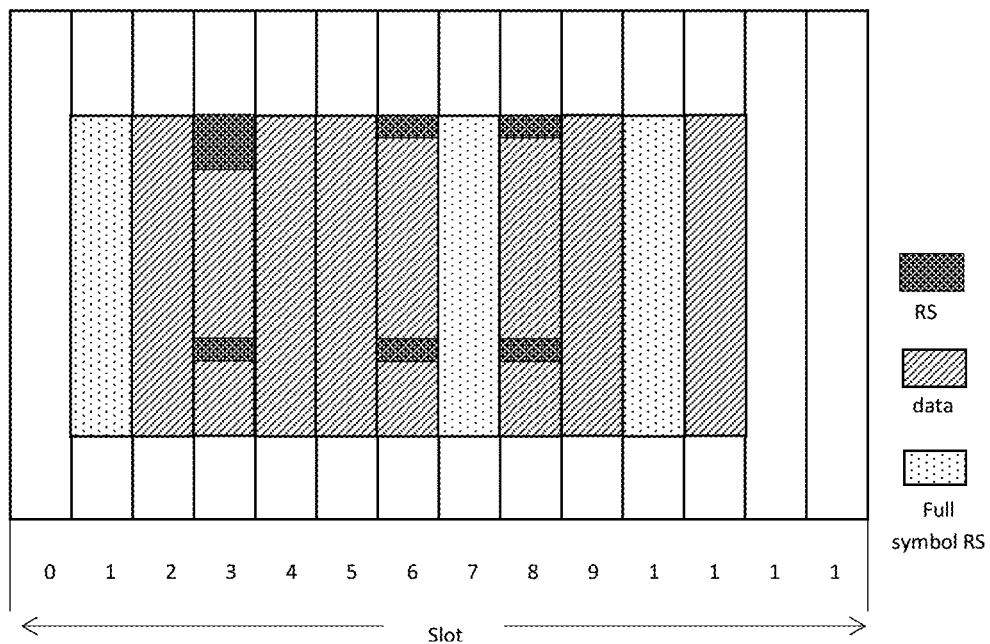

FIGS. 50 to 53 show an illustration of symbol structures for transmission in a slot. FIG. 50 shows an illustration of symbol structure, where at least one symbol has at least one large sized RS either with post-fix, or pre-fix or both pre-fix and post fix, along with at least one small sized RS chunk, other symbols in the proposed slot structure will have symbols with at least one small sized RS chunks. FIG. 51 shows an illustration of another symbol structures where at least one symbol has at least one large sized RS either with post-fix, or pre-fix or both pre-fix and post-fix, and at least one small sized RS chunk, and the other symbols in this structure may or may not have RS chunks in it. FIG. 52 shows an illustration of a symbol structure in another embodiment, where at least one symbol has at least one large sized RS either with post-fix, or pre-fix or both pre-fix and post-fix, and at least one small sized RS chunk, at least one symbol has filtered-extended bandwidth DFT-s-OFDM symbol with only RS, and the other symbols in this structure may or may not have RS chunks in it.

Figure 53:
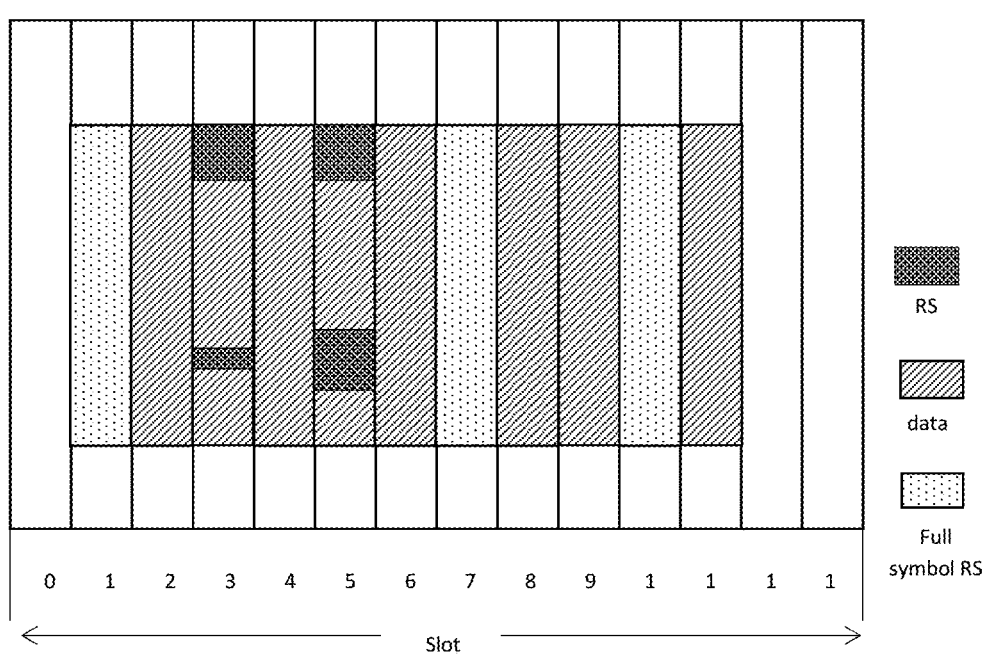

FIG. 53 shows another illustration of a symbol structure, where at least one symbol has at least one large sized RS either with post-fix, or pre-fix or both pre-fix and post-fix, and at least one small sized RS chunk, at least one symbol has filtered-extended bandwidth DFT-s-OFDM symbol with only RS, and the other symbols in this structure may or may not have RS chunks in it. Hence, with the generated waveform structure using the FIGS. 17-19, the symbols in a slot is a plain DFT-s-OFDM symbol carrying either RS or data, or DFT-s-OFDM with at least one smaller RS chunk for phase tracking, or DFT-s-OFDM symbol with at least one smaller RS chunk or at least one larger RS chunk. The smaller RS chunk and larger RS chunk may have either post-fix, or pre-fix, or both pre-fix and post-fix.

In an embodiment, density of filtered-bandwidth extended DFT-s-OFDM symbol comprising RS and data is dependent on at least one of an operating SNR and a Doppler shift between a transmitter and a receiver. Also, density of filtered-bandwidth extended DFT-s-OFDM symbol comprising only RS is dependent on at least one of an operating SNR and a Doppler shift between a transmitter and a receiver.

The overall RS, CP for RS overhead required for each modulation scheme for the proposed RS and data multiplexing with different subcarrier spacing's and different delay spreads are capture in table no. 2, 3, 4, 5, 6, 7, 8, 9, 10, 11, 21, 13, 14, 15. Table 1 gives the channel model and delay spread used for each subcarrier spacing.

The slot which has 14 OFDM symbols may contain at least one OFDM symbols of the proposed Pre-DFT RS and data multiplexed DFT-s-OFDM with excess bandwidth shaping. When the number of symbols allocated with the proposed system is more than one OFDM symbol, the long RS may be presented in one of the OFDM symbols that may be front loaded. Short RS or PTRS may be present in other symbols including the symbol with long RS. Channel estimation is performed on the symbol with long RS, and the small RS chunks or PTRS can be used for phase tracking. This way RS density can be low and the latency can be from at least 1 to at max allocated number of OFDM symbols.

In an embodiment, with the pre DFT RS and data multiplexed DFT-s-OFDM with excess bandwidth shaping, the percentage of RS overhead will be $$\frac{\delta_{RS} N_{RS}}{N}.$$

Here, $\delta_{RS}$ may be the percentage overhead mentioned in the tables 2-10, while $N_{RS}$, N are the number of symbols carrying RS along with data, and the total number of symbols allocated. For the existing 3GPP scheme, the overhead percentage will be $$\frac{N_{RS}}{N} \times 100.$$

TABLE 1 channel conditions for a given subcarrier spacing

| Subcarrier spacing (KHz) | Normalized Delay spread for TDL-C channel (nsec) | Normalized Delay spread for TDL-C channel (nsec) |
|---|---|---|
| 30 | 100 | 865 |
| 120 | 30 | 259.5 |
| 240 | 10 | 86.5 |

TABLE 2

Overall overhead requirement for each modulation scheme with subcarrier spacing of 30 KHz and 10PRB allocation and 5% extension 10 PRBs with 5% extension

| Modulation | RS (samples) | CP (samples) | Total overhead (RS + 2*cp) (samples) | % of overhead |
|---|---|---|---|---|
| QPSK (R = 0.44) | 19 | 7 | 33 | 27 |
| 16 QAM (R = 0.49) | 23 | 13 | 49 | 40 |
| 64 QAM (R = 0.6) | 29 | 13 | 55 | 46 (BLER = 0.0032) |
| 256 QAM (R = 0.8) | 31 | 13 | 57 | 47.5 (BLER = 0.02) |

TABLE 3

Overall overhead requirement for each modulation scheme with subcarrier spacing of 30 KHz and 10PRB allocation and 10% extension
10 PRBs with 10% extension

| Modulation | RS (samples) | CP (samples) | Total overhead (RS + 2*cp) (samples) | % of overhead |
|---|---|---|---|---|
| QPSK (R = 0.44) | 13 | 5 | 23 | 19.2 |
| 16 QAM (R = 0.49) | 19 | 7 | 33 | 27.5 |
| 64 QAM (R = 0.6) | 23 | 7 | 47 | 39.2 |
| 256 QAM (R = 0.8) | 31 | 13 | 57 | 47.5 (BLER = 0.0032) |

TABLE 4

Overall overhead requirement for each modulation scheme with subcarrier spacing of 30 KHz and 10PRB allocation and 25% extension
10 PRBs with 25% extension

| Modulation | RS (samples) | CP (samples) | Total overhead (RS + 2*cp) (samples) | % of overhead |
|---|---|---|---|---|
| QPSK (R = 0.44) | 13 | 2 | 17 | 14 |
| 16 QAM (R = 0.49) | 13 | 5 | 23 | 20 |
| 64 QAM (R = 0.6) | 19 | 5 | 29 | 24 |
| 256 QAM (R = 0.8) | 29 | 13 | 55 | 45 |
| 256 QAM (R = 0.667) | 29 | 7 | 43 | 36 |

TABLE 5

Overall overhead requirement for each modulation scheme with subcarrier spacing of 30 KHz and 100PRB allocation with 5% extension
100 PRBs with 5% extension

| Modulation | RS (samples) | CP (samples) | Total overhead (RS + 2*cp) (samples) | % of overhead |
|---|---|---|---|---|
| QPSK (R = 0.44) | 97 | 47 | 191 | 16 |
| 16 QAM (R = 0.49) | 97 | 47 | 191 | 16 |
| 64 QAM (R = 0.6) | 97 | 47 | 191 | 16 |
| 256 QAM (R = 0.8) | 97 | 47 | 191 | 16 |

TABLE 6

Overall overhead requirement for each modulation scheme with subcarrier spacing of 30 KHz and 100PRB allocation with 10% extension
100 PRBs with 10% extension

| Modulation | RS (samples) | CP (samples) | Total overhead (RS + 2*cp) (samples) | % of overhead |
|---|---|---|---|---|
| QPSK (R = 0.44) | 97 | 47 | 191 | 16 |
| 16 QAM (R = 0.49) | 97 | 47 | 191 | 16 |
| 64 QAM (R = 0.6) | 97 | 47 | 191 | 16 |
| 256 QAM (R = 0.8) | 97 | 47 | 191 | 16 |

TABLE 7

Overall overhead requirement for each modulation scheme with subcarrier spacing of 30 KHz and 100PRB allocation with 25% extension
100 PRBs with 25% extension

| Modulation | RS (samples) | CP (samples) | Total overhead (RS + 2*cp) (samples) | % of overhead |
|---|---|---|---|---|
| QPSK (R = 0.44) | 97 | 23 | 143 | 12 |
| 16 QAM (R = 0.49) | 97 | 23 | 143 | 12 |
| 64 QAM (R = 0.6) | 97 | 47 | 191 | 16 |
| 256 QAM (R = 0.8) | 97 | 47 | 191 | 16 |

TABLE 8

Overall overhead requirement for each modulation scheme with subcarrier spacing of 120 KHz and 198PRB allocation with 5% extension
198 PRBs with 5% extension

| Modulation | RS (samples) | CP (samples) | Total overhead (RS + 2*cp) (samples) | % of overhead |
|---|---|---|---|---|
| QPSK (R = 0.44) | 197 | 47 | 291 | 12 |
| 16 QAM (R = 0.49) | 197 | 47 | 291 | 12 |
| 64 QAM (R = 0.6) | 197 | 97 | 391 | 16.5 |
| 256 QAM (R = 0.8) | 197 | 97 | 391 | 16.5 |

TABLE 9

Overall overhead requirement for each modulation scheme with subcarrier spacing of 120 KHz and 198PRB allocation with 10% extension
198 PRBs with 10% extension

| Modulation | RS (samples) | CP (samples) | Total overhead (RS + 2*cp) (samples) | % of overhead |
|---|---|---|---|---|
| QPSK (R = 0.44) | 197 | 47 | 291 | 12 |
| 16 QAM (R = 0.49) | 197 | 47 | 291 | 12 |
| 64 QAM (R = 0.6) | 197 | 97 | 391 | 16.5 |
| 256 QAM (R = 0.8) | 197 | 97 | 391 | 16.5 |

TABLE 10

Overall overhead requirement for each modulation scheme with subcarrier spacing of 120 KHz and 100PRB allocation with 25% extension
100 PRBs with 25% extension

| Modulation | RS (samples) | CP (samples) | Total overhead (RS + 2*cp) (samples) | % of overhead |
|---|---|---|---|---|
| QPSK (R = 0.44) | 97 | 23 | 143 | 12 |
| 16 QAM (R = 0.49) | 97 | 23 | 143 | 12 |
| 64 QAM (R = 0.6) | 97 | 47 | 191 | 16 |
| 256 QAM (R = 0.8) | 97 | 47 | 191 | 16 |

TABLE 11

Overall overhead requirement for each modulation scheme with subcarrier spacing of 120 KHz and 198PRB allocation and 25% extension 198 PRBs with 25% extension

| Modulation | RS (samples) | CP (samples) | Total overhead (RS + 2*cp) (samples) | % of overhead |
|---|---|---|---|---|
| QPSK (R = 0.44) | 197 | 47 | 291 | 12 |
| 16 QAM (R = 0.49) | 197 | 47 | 291 | 12 |
| 64 QAM (R = 0.6) | 197 | 97 | 391 | 17 |
| 256 QAM (R = 0.8) | 197 | 97 | 391 | 17 |

TABLE 12

Overall overhead requirement for each modulation scheme with subcarrier spacing of 240 KHz and 100PRB allocation and 25% extension 100 PRBs with 25% extension

| Modulation | RS (samples) | CP (samples) | Total overhead (RS + 2*cp) (samples) | % of overhead |
|---|---|---|---|---|
| QPSK (R = 0.44) | 47 | 23 | 93 | 8 |
| 16 QAM (R = 0.49) | 97 | 23 | 143 | 12 |
| 64 QAM (R = 0.6) | 97 | 23 | 143 | 12 |
| 256 QAM (R = 0.8) | 97 | 23 | 143 | 12 |

TABLE 13

Overall overhead requirement for each modulation scheme with subcarrier spacing of 240 KHz and 198PRB allocation and 5% extension 198 PRBs with 5% extension

| Modulation | RS (samples) | CP (samples) | Total overhead (RS + 2*cp) (samples) | % of overhead |
|---|---|---|---|---|
| QPSK (R = 0.44) | 97 | 29 | 155 | 6 |
| 16 QAM (R = 0.49) | 97 | 47 | 191 | 8 |
| 64 QAM (R = 0.6) | 97 | 47 | 191 | 8 |
| 256 QAM (R = 0.8) | 197 | 47 | 291 | 12 |

TABLE 14

Overall overhead requirement for each modulation scheme with subcarrier spacing of 240 KHz and 198PRB allocation and 10% extension 198 PRBs with 10% extension

| Modulation | RS (samples) | CP (samples) | Total overhead (RS + 2*cp) (samples) | % of overhead |
|---|---|---|---|---|
| QPSK (R = 0.44) | 97 | 29 | 155 | 6 |
| 16 QAM (R = 0.49) | 97 | 47 | 191 | 8 |
| 64 QAM (R = 0.6) | 97 | 47 | 191 | 8 |
| 256 QAM (R = 0.8) | 197 | 47 | 291 | 12 |

TABLE 15

Overall overhead requirement for each modulation scheme with subcarrier spacing of 240 KHz and 198PRB allocation and 25% extension 198 PRBs with 25% extension

| Modulation | RS (samples) | CP (samples) | Total overhead (RS + 2*cp) (samples) | % of overhead |
|---|---|---|---|---|
| QPSK (R = 0.44) | 97 | 29 | 155 | 6 |
| 16 QAM (R = 0.49) | 97 | 47 | 191 | 8 |
| 64 QAM (R = 0.6) | 97 | 47 | 191 | 8 |
| 256 QAM (R = 0.8) | 197 | 47 | 291 | 12 |

An OFDM is a multi-carrier waveform, is widely used in wireless communication systems to support higher data rates, which suffers from high PAPR. This results in higher power amplifier back-off and lower transmit power. In DFT-s-OFDM systems, data is first pre-coded with a DFT and then mapped to allocated bandwidth. Also, pi/2-BPSK modulation is used for both data and RS along with spectrum shaping for PAPR reduction, which may not be efficient for other higher order modulation schemes or other sequences.

One embodiment of the present disclosure is transmission of filtered-extended bandwidth DFT-s-OFDM symbol with one of only RS and filtered-extended bandwidth DFT-s-OFDM symbol with one of only data in different symbols with spectrum extension as shown in FIGS. 54 and 55 to generate one of filtered-extended DFT-s-OFDM symbol with full RS and filtered-extended DFT-s-OFDM symbol with full data. In a proposed architecture, the data and RS of a user is transmitted in different OFDM symbols with spectrum extension and spectrum shaping. The RS symbol is used for channel estimation at the receiver to equalize the effect of channel on data.

One embodiment of the current disclosure is a method to extend the DFT pre-coded symbol cyclically by adding pre-fix and post-fix to the DFT pre-coded data. Furthermore, spectrum shaping is performed on this cyclically extended symbol to reduce the PAPR. Similar procedure can be expanded to Reference Sequence (RS) also.

FIG. 54 shows a block diagram of a transmitter for data transmission in one OFDM symbol with spectrum shaping and excess bandwidth. As shown in FIG. 54, for an allocated M subcarrier, the data may be pi/2 Binary Phase Shift Keying (BPSK), Quadrature Phase Shift Keying (QPSK) or any Quadrature Amplitude Modulation (QAM), or Pulse Amplitude Modulation (PAM) modulation symbols. The data that needs to transmitted may be control data or user specific data. The data sequence may be represented by x(n), where n=0, 1, ..., M−1.

One embodiment in the current disclosure is the generation of sequence r(n) to be used as Demodulation Reference Sequence (DMRS) along with spectrum extension. The DMRS sequence can be pi/2 Binary Phase Shift Keying (BPSK), Quadrature Phase Shift Keying (QPSK), or Zadoff-Chu (ZC) sequences. The QPSK or BPSK sequences may be obtained from Walsh, m-sequence, Kasami sequence or gold sequence. ZC sequences are obtained using the following expression $$x(n) = \exp\exp(-jun(n+1+2q)/Nz)$$

where Nz is the length of the sequence, n=0, 1, ..., Nz−1, j is square root of −1, u=0, 1, ..., Nz−1, q is an integer. The ZC sequence that may be used as reference sequence can be as defined in the above expression or cyclic extended version of the same. To obtain port specific RS, an orthogonal cover code may be applied on the RS sequences. RS can occupy any portion of M sub-carriers allocated to the user, which may depend on properties of channel or other properties like spectrum shaping filter. Either symmetric extension similar to data or the RS in time domain may be cyclically extended for length M+d and then used for mapping in the RS symbol. FIG. 55 shows a block diagram of a transmitter for transmission of RS in one OFDM symbol with spectrum shaping and excess bandwidth.

The DFT precoding of size M is accomplished on the both data sequence and DMRS sequence 'x(n)' using an M-point DFT to obtain DFT precoded symbols as $$X(k) = \frac{1}{\sqrt{M}} \sum_{n=0}^{M-1} x(n) e^{-\frac{j2\pi kn}{M}}$$

A spectrum extension for the DFT pre-coded symbol is performed by copying the last d/2 samples of the pre-coded data to the beginning of the symbol as pre-fix and copying the initial d/2 samples of the pre-coded data to the end of the symbol as post-fix. This results in an OFDM symbol of size M+d, and can be represented as, $$X_{exs}(k) = X\left(\left(k - \frac{d}{2}\right) \bmod M\right)$$

where, k=0, 1, ..., M+d−1. Or the spectrum extension operation of the DFT precoded symbol is performed by the following equation $$X_{exs}(k) = X((k-K) \bmod M)$$

Here, K is an arbitrary shift applied on the DFT precoded sequence. The additional bandwidth that needs to be used for spectrum extension is indicated to the UE by a base station (BS). The BS, also referred gNB, as may indicate either extension on one side of the allocated bandwidth or two sides of the allocated bandwidth in steps of half PRB or one PRB. The signaling of the excess bandwidth may be done as a part of resource allocation. The Bandwidth extension on the either side of the allocated bandwidth may be almost equal such that the spectrum shaping filter can be symmetric. The spectrum extension may be asymmetric also, which means, the additional bandwidth on each side of the allocated bandwidth may be of different sizes.

Alternately, the BS or the gNB may indicate the user 2 parameters, usable BW where data is allocated and excess BW where shaping is allowed. The BS may indicate a plurality of parameters or two parameters, usable BW where data is allocated and excess BW where shaping is allowed. The gNB scheduler may take care of these 2 parameters per UE as part of the entire scheduling operations. The excess BW when symmetric can be assumed to have equal guard subcarriers on either side of the allocated spectrum. However, for asymmetric cases, an additional parameter which indicates the start location of the usable BW can be indicated between UE and gNB.

Alternately, the guard subcarriers can be defined a priori in specification via a pre-agreed table between the UE and the BS. The length of starting subcarriers that act as guard band can be defined a priori. Then the resource allocation number of PRBs will be occupied. Then the remaining subcarriers can be left empty for shaping. For a given allocation M, the minimum length "d" of excess subcarriers may be derived using apriori simulations and defined in specifications. When a UE is allocated resources at the edge of the BW i.e., from PRB0, the excess subcarriers on one side of the BW which fall into the guard band of subcarrier can be considered to be 0. All "d" excess subcarriers may be used on the other side of resource allocation.

The spectrum shaping is performed on the spectrum extended data by multiplying with the filter. The filter can be square root raise cosine, raised cosine, Hanning, Blackman or Hamming windows. When the excess bandwidth is zero, i.e., d=0, the spectrum shaping that needs to be performed is within the band. Hence, in this case, spectrum shaping can be performed in time-domain also by circular convolution of the filter with the time domain symbol. The spectrum shaping filter either be specified by the base station or can be unknown at the base station. The spectrum shaping filter may be specified or specification transparent. The spectrum shaping filter applied on the data and RS may be same, or the filter is applied on only RS but not on data. In the case where spectrum shaping is applied only on RS, the filter is specified at the receiver. The spectrum shaped data is mapped to the allocated subcarriers, followed by an IFFT of size N before transmitting the signal.

Since extra bandwidth is being used for generation of transmitted signal, this method offers low PAPR signal at the transmitter. Hence, power boosting of the transmitter signal may be performed. When the traffic/load on the system is low, excess bandwidth can be used for generation of transmitted signal to obtain low PAPR signal irrespective of the MCS being used. However, for pi/2-BPSK, the transmitted signal can be generated either with spectrum extension or without spectrum extension. When the load on the base stations is low, pi/2-BPSK can be transmitted with excess bandwidth also. Hence with this method, the user may get the benefited with low PAPR and high SINR. This technique may be used for reducing PAPR of other modulation schemes and reference signals as well.

In another embodiment, an indication may be sent between UE and gNB if the excess subcarriers may be used for receiver processing or not. If the excess subcarriers are used by other UEs, then this UE may not consider it for further processing. Else this can be considered via one of the receiver methods explained later.

FIGS. 56 and 57 shows a block diagram of a receiver for receiving a DFT-s-OFDM signal, RS and data, in accordance with some embodiments of the present disclosure. The receiver also referred as system or communication system. As shown in the FIG. 56, the receiver receives symbol which is first passed through an FFT of size N followed by sub-carrier de-mapper to the de-map the user data of size M+d. The de-mapped RS symbol will be used for channel estimation, which may be used for equalizing the channel on the data symbol. A least-squares estimation is used to get the channel estimates on all M+d subcarriers. The estimates on the central sub-carriers are collected as channel H_0(k). The M+d size estimated channel is right shifted by M subcarriers, and the central M-channel estimates are collected and represented as H_1(k). Similarly, the estimated 'M+d' estimates are left shifted by M sub-carriers to collect the central M sub-carriers and represented as H_2(k).

As shown in FIG. 57, on the de-mapped data symbol, center M subcarriers are collected and represented as Y_0(k). Like RS symbol processing, the de-mapped data is right shifted to collect central M subcarriers to get Y_1(k). Similarly, data is left shifted by M samples to get Y_2(k) by collecting central M subcarriers from the shifted data. The collected received Y_i(k) is equalized by multiplying with conjugate of H_i(k) to obtain equalized data z_i(k), where i={1, 2, 3}. To get effective equalized data, respective subcarriers of z_i(k)s are added up and sent to IDFT module.

The receiver uses the excess bandwidth in estimation, which eventually used for equalization. Hence, the system results in improvement in the SINR of the received signal. Since an extra bandwidth is being used for generation of transmitted signal, this method offers low PAPR for signal at the transmitter. Hence, power boosting of the transmitter signal may be performed. When the traffic/load on the system is low, excess bandwidth may be used for generation of transmitted signal to obtain low PAPR signal irrespective of the MCS being used. However, for pi/2-BPSK the transmitted signal can be generated either with spectrum extension or without spectrum extension. Also, when the load on the base stations is low, pi/2-BPSK may be transmitted with excess bandwidth. Using this method, the user may get the benefited with low PAPR and high SINR.

FIG. 58 shows a block diagram of a transmitter for each user with data in one OFDM symbol with spectrum shaping and excess bandwidth, in accordance with an embodiment of the present disclosure. FIG. 59 a block diagram of a transmitter for each user with RS in one OFDM symbol with spectrum shaping and excess bandwidth, in accordance with an embodiment of the present disclosure. One embodiment of the present disclosure is Port multiplexing, in which, data and RS of a user is transmitted in different OFDM symbol with both spectrum extension and spectrum shaping to support multi user or layer or port. The number of ports to be supported be 'P' with each user port/user/layer allocated with allocated bandwidth of M subcarriers. The length of Reference Sequence per port is M/P. The M/P length RS of a user can be pi/2-BPSK, QPSK, or ZC sequences. The RS may have either pre-fix or both pre-fix and post-fix. To perform DFT precoding, M/P length DFT is taken on the RS of each port. An M length RS is obtained by interleaving zeros in between the precoded M/P RS. The number of nulls between any two precoded RS samples may be P−1.

The DFT pre-coded RS is extended by adding d/2 samples from the end of the precoded symbol to the beginning of the symbol as pre-fix and adding d/2 samples from the beginning of the precoded symbol to the end of the symbol as post-fix. The size of the symbol after adding excess bandwidth is "M+d". The additional bandwidth that needs to be used for spectrum extension is indicated to the UE by the base station. Base station may indicate either extension on one side of the allocated bandwidth or two sides of the allocated bandwidth in steps of half PRB or one PRB. The signaling of the excess bandwidth may be done as a part of resource allocation. The Bandwidth extension on the either side of the allocated bandwidth may almost equal such that the spectrum shaping filter can be symmetric. The spectrum extension may be asymmetric also, which means, the additional bandwidth on each side of the allocated bandwidth may be of different sizes.

Alternately the BS or the gNB may indicate the UE or the user two parameters, usable BW where data is allocated and excess BW, where shaping is allowed. In an embodiment, the BS may indicate plurality of parameters to the UE, usable BW where data is allocated and excess BW. In another embodiment, the BS may indicate one or more parameters to the UE, usable BW where data is allocated and excess BW. The BS scheduler may take care of these 2 parameters per UE as part of the entire scheduling operations. Alternately, the guard subcarriers can be defined a priori in specification via a pre-agreed table between UE and gNB. The length of starting subcarriers that act as guard band can be defined a priori. Then the resource allocation number of PRBs will be occupied. Then the remaining subcarriers can be left empty for shaping. For a given allocation M, the minimum length "d" of excess subcarriers may be derived using apriori simulations and defined in specifications. When a UE is allocated resources at the edge of the BW i.e., from PRB0, the excess subcarriers on one side of the BW which fall into the guard band of subcarrier can be considered to be 0. All "d" excess subcarriers may be used on the other side of resource allocation.

A spectrum shaping filter is used for filtering, which may be one of, but not limited to, a squared root raised cosine, Raised Cosine, Hanning, Blackman or Hamming windows. If the spectrum extension is not performed, i.e., number of extra samples added in frequency domain d is zero, then spectrum shaping can be performed in time domain using circular convolution. The spectrum shaping filter either be specified by the base station or can be unknown at the base station. The spectrum shaping filter may be RANI specified or specification transparent. The spectrum shaping filter applied on the data and RS may be same, or the filter is applied on only RS but not on data. In the case where spectrum shaping is applied only on RS, the filter is specified at the receiver. The spectrum shaped RS is mapped to the allocated resources and an IFFT of size N is takes on the mapped data to transmit it.

The M-length data of each data symbol that is transmitted on each port is specific to user, and this data may be pi/2-BPSK, or QPSK, or any PAM or QAM modulated symbols. To perform DFT preceding, a DFT of size M is taken on the M-length data points. The M length DFT precoded data is extended to M+d samples by copying the edge d/2 samples to the beginning of the precoded symbol as pre-fix and by copying the initial d/2 samples of precoded data to the end of the symbol as post-fix. The size of the symbol after extension/addition of excess samples is M+d. The additional bandwidth that needs to be used for spectrum extension is indicated to the UE by the BS.

The BS may indicate either extension on one side of the allocated bandwidth or two sides of the allocated bandwidth in steps of half PRB or one PRB. The signaling of the excess bandwidth may be done as a part of resource allocation. The Bandwidth extension on the either side of the allocated bandwidth may almost equal such that the spectrum shaping filter can be symmetric. The spectrum extension may be asymmetric also, which means, the additional bandwidth on each side of the allocated bandwidth may be of different sizes. Alternately the gNB may indicate the user 2 parameters—usable BW where data is allocated and excess BW where shaping is allowed. The gNB scheduler may take care of these 2 parameters per UE as part of the entire scheduling operations. Alternately, the guard subcarriers can be defined a priori in specification via a pre-agreed table between UE and gNB. The length of starting subcarriers that act as guard band can be defined a priori. Then the resource allocation number of PRBs will be occupied. Then the remaining subcarriers can be left empty for shaping. For a given allocation M, the minimum length "d" of excess subcarriers may be derived using apriori simulations and defined in specifications. When a UE is allocated resources at the edge of the BW i.e., from PRB0, the excess subcarriers on one side of the BW which fall into the guard band of subcarrier can be considered to be 0. All "d" excess subcarriers may be used on the other side of resource allocation.

Spectrum shaping filter is applied on top of this. The spectrum shaping filter can be Squared root raised cosine, Raised Cosine, Hanning, Blackman or Hamming windows.

If the spectrum extension is not performed, i.e., number of extra samples added in frequency domain d is zero, then spectrum shaping can be performed in time domain using circular convolution. The spectrum shaping filter either be specified by the base station or can be unknown at the base station. The spectrum shaping filter may be specified or specification transparent. The spectrum shaping filter applied on the data and RS may be same, or the filter is applied on only RS but not on data. In the case where spectrum shaping is applied only on RS, the filter is specified at the receiver. The spectrum shaped RS is mapped to the allocated resources and an IFFT of size N is takes on the mapped data to transmit it.

FIGS. 60 and 61 shows a block diagram of a receiver for receiving a DFT-s-OFDM signal, in accordance with another embodiment of the present disclosure. At the receiver, received symbol is first processed with an FFT of size N followed by sub-carrier de-mapper to de-map the user data of size M+d. After de-mapping, RS symbol will be used for channel estimation, which is eventually used for equalization of user data. The M+d de-mapped RS symbol subcarriers are used to estimate the channel for each per receiver antenna. Estimation may be performed either by Least squares estimation followed by linear interpolation or by least squares followed by DFT based channel estimation. After estimating the channel for M+d subcarriers for each user on a receive antenna, central M subcarriers are collected and represented as $H\_0(k)$. The estimated channel per user is right shifted by M subcarriers to collected central M subcarriers of interest and represented as $H\_1(k)$. Similarly, the estimated channel per user on each receiver antenna is left shifted and central M subcarriers are collected and represented as $H\_2(k)$. Each antenna outputs are stacked in a column vector format to eventually form a matrix per subcarrier. These matrices $H\_0(k)$, $H\_1(k)$, and $H\_2(k)$ will be used for channel equalization on data symbols.

The demapped data symbol with length M+d is also processed similar to RS symbol processing. From the demapped M+d subcarriers on each receive antenna, central M subcarriers are collected and represented as $Y\_0(k)$. The demapped data is right shifted by M subcarriers to collected central M subcarriers of interest and represented as $Y\_1(k)$. Similarly, the demapped data on each receiver antenna is left shifted and central M subcarriers are collected and represented as $Y\_2(k)$. Each antenna outputs are stacked in a column vector format to eventually form a matrix per subcarrier. Each $Y\_i(k)$ is equalized with respective $H\_i(k)$ using MMSE equalizer to obtain equalized data $z\_i(k)$, where i={1, 2, 3}. To get effective equalized data, respective subcarriers of $z\_i(k)$s are added up and sent to IDFT module to counter the DFT precoding, which is performed at the receiver.

At the receiver, the excess bandwidth is used in estimation, which eventually used for equalization. Hence, the system results in improvement in the SINR of the received signal. And since extra bandwidth is being used for generation of transmitted signal, this method offers low PAPR for signal at the transmitter. Hence, power boosting of the transmitter signal may be performed. When the traffic/load on the system is low, excess bandwidth can be used for generation of transmitted signal to obtain low PAPR signal irrespective of the MCS being used. However, for pi/2-BPSK, the transmitted signal can be generated either with spectrum extension or without spectrum extension. When the load on the base stations is low, pi/2-BPSK can be transmitted with excess bandwidth also. With this proposed method, the user may get the benefited with low PAPR and high SINR.

In an embodiment the Base Station indicates to the UE the number of additional subcarriers the can be used by the UE to apply spectrum shaping so that UE can increase the tx power level.

The UE uses additional (excess) subcarrier on either side of the allocated resources, of equal length of either side so that spectrum shaping filter is symmetric filter. When the excess subcarrier on either side can be unequal.

The excess number of subcarriers may be signalled (as one side length) in steps of Half PRB (Half PRB, one PRB etc.).

FIG. 62 shows a block diagram of a receiver, in another embodiment of the present disclosure. As shown in FIG. 62, channel estimation is performed using one of the chunks in filtered-extended bandwidth DFT-s-OFDM symbol comprising both RS and data, or using one of the filtered-extended bandwidth DFT-s-OFDM symbol with only RS.

FIG. 63 shows a flowchart illustrating a method for transmitting a waveform in a communication network, in accordance with some embodiments of the present disclosure.

As illustrated in FIG. 63, the method 6300 comprises one or more blocks for transmitting a waveform. The method 6300 may be described in the general context of computer executable instructions. Generally, computer executable instructions can include routines, programs, objects, components, data structures, procedures, modules, and functions, which perform functions or implement abstract data types.

The order in which the method 6300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 6310, generating, by a receiver, at least one of: at least one data sequence and at least one reference sequence (RS). The at least one data sequence is one of a pi/2 binary phase shift keying (BPSK) sequence, a BPSK sequence, a Quadrature Phase Shift Keying (QPSK) sequence, M-ary Quadrature Amplitude Modulation (QAM) sequence, and an M-ary Phase Shift Keying (PSK) sequence. In an embodiment, the at least one data sequence includes at least one of a user data and a control information. Each of the at least one data sequence includes at least one data, and at least one of a data cyclic prefix and a data cyclic suffix.

The at least one RS is one of a pi/2 binary phase shift keying (BPSK) sequence, a BPSK sequence, a Zadoff-Chu (ZC) sequence, a Quadrature Phase Shift Keying (QPSK) sequence, and a M-ary Phase Shift Keying (PSK) sequence. In an embodiment, each of the at least one RS sequence includes at least one RS chunk, at least one of a RS cyclic prefix and a RS cyclic suffix, size of the RS cyclic prefix is one of at least half of the RS chunk size and an arbitrary value, size of the RS cyclic suffix is one of at least half of the RS chunk size and an arbitrary value At block 6320, time-multiplexing is performed for the at least one data sequence with the at least one RS, to generate a multiplexed sequence. The extended bandwidth (BW) symbol generator generates a filtered-extended bandwidth DFT-s-OFDM symbol using the multiplexed sequence. FIG.

17B shows a block diagram of extended BW symbol generator, in accordance with an embodiment of the present disclosure. In an embodiment, the filtered-extended bandwidth DFT-s-OFDM symbol includes a plurality of RS chunks, wherein size of the plurality of RS chunks is different. In an embodiment, the filtered-extended bandwidth DFT-s-OFDM symbol includes a plurality of RS chunks, wherein the size of the plurality of RS chunks is same.

At block 6330, a filtered-extended bandwidth DFT-s-OFDM full RS symbol is generated for the multiplexed sequence comprising of at least one RS sequence. Similarly, a filtered-extended bandwidth DFT-s-OFDM full data symbol is generated for the multiplexed sequence comprising of at least one data sequence.

The advantages of the "a filtered-extended bandwidth DFT-s-OFDM symbol" signal are:
a. The spectrum shaping of excess BW reduces the PAPR and increases the overall transmission power
b. Multiple RS blocks can be multiplexed to track the channel. In one embodiment, a "long RS block" can be used to the estimate the overall channel impulse response and "short RS blocks" (including single pilot) can be distributed over the span of the symbol to track the phase changes. Alternatively, multiple RS blocks of equal length can be used to estimate the channel locally and equalize the adjacent data blocks.

Further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method for transmitting a waveform, comprising:
generating, by a transmitter, at least one of: at least one data sequence and at least one reference sequence (RS);
time-multiplexing, by the transmitter, the at least one data sequence with the at least one RS, to generate a multiplexed sequence; and
generating, by the transmitter, a filtered-extended bandwidth DFT-s-OFDM symbol using the multiplexed sequence, wherein:
 each of the at least one RS sequence includes at least one RS chunk, at least one of a RS cyclic prefix and a RS cyclic suffix;
 size of the RS cyclic prefix or RS cyclic suffix depends on one of channel conditions, modulation order, coding rate, impulse response of spectrum shaping filter and power capability of the transmitter, and
 size of at least one of the RS cyclic prefix and the RS cyclic suffix is one of at least half of the RS chunk size and an arbitrary value.

2. The method as claimed in claim 1, wherein generating a filtered-extended bandwidth DFT-s-OFDM symbol using the multiplexed sequence comprising:
transforming the multiplexed sequence using a Discrete Fourier Transform (DFT) to generate a transformed multiplexed sequence;
performing padding operation by prefixing the transformed multiplexed sequence with a first predefined number (N1) of subcarriers and post-fixing the transformed multiplexed sequence with a second predefined number (N2) of subcarriers to obtain an extended bandwidth transformed multiplexed sequence;
mapping the extended bandwidth transformed multiplexed sequence with at least one of localized and distributed subcarriers to generate a mapped extended bandwidth transformed multiplexed sequence;
shaping the mapped extended bandwidth transformed multiplexed sequence using a filter to obtain a shaped extended bandwidth transformed multiplexed sequence;
performing an Inverse Fast Fourier Transform (IFFT) on the shaped extended bandwidth transformed multiplexed sequence to produce a time domain sequence; and
processing the time domain sequence to generate the filtered-extended bandwidth DFT-s-OFDM symbol.

3. The method as claimed in claim 2, wherein value of the N1 is at least zero, and value of the N2 is at least zero.

4. The method as claimed in claim 2, wherein the value of N1 and N2 depends on one of channel conditions, modulation order, coding rate, impulse response of spectrum shaping filter.

5. The method as claimed in claim 2, wherein a length of the excess subcarriers added to the transformed multiplexed sequence is explicitly indicated by one of a transmitter to a receiver and a receiver to a transmitter, said explicit indication is one of a function of allocation to the receiver and a plurality of predefined values at the transmitter.

6. The method as claimed in claim 2, wherein a length of the excess subcarriers added to the transformed multiplexed sequence is explicitly indicated by a transmitter to a receiver, said explicit indication is one of a function of number of subcarrier allocation and a plurality of predefined values at the transmitter and power capability of the transmitter.

7. The method as claimed in claim 1, wherein the at least one data sequence is one of a pi/2 binary phase shift keying (BPSK) sequence, a BPSK sequence, a Quadrature Phase Shift Keying (QPSK) sequence, M-ary Quadrature Amplitude Modulation (QAM) sequence, and an M-ary Phase Shift Keying (PSK) sequence.

8. The method as claimed in claim 1, wherein the at least one data sequence includes at least one of a user data and a control information.

9. The method as claimed in claim 1, wherein the at least one RS is one of a pi/2 binary phase shift keying (BPSK) sequence, a BPSK sequence, a Zadoff-Chu (ZC) sequence, a Quadrature Phase Shift Keying (QPSK) sequence, and a M-ary Phase Shift Keying (PSK) sequence.

10. The method as claimed in claim 1, wherein when the at least one data and the at least one RS sequence are pi/2-BPSK, wherein the multiplexed sequence is rotated by 90 degrees between successive elements of the multiplexed sequence to generate a rotated multiplexed sequence.

11. The method as claimed in claim 1, wherein a filtered-extended bandwidth DFT-s-OFDM full RS symbol is generated for the multiplexed sequence comprising of at least one RS sequence.

12. The method as claimed in claim 1, wherein a filtered-extended bandwidth DFT-s-OFDM full data symbol is generated for the multiplexed sequence comprising of at least one data sequence.

13. The method as claimed in claim 1, wherein each of the at least one data sequence includes at least one data, and at least one of a data cyclic prefix and a data cyclic suffix.

14. The method as claimed in claim 1, wherein the filtered-extended bandwidth DFT-s-OFDM symbol includes a plurality of RS chunks, wherein size of the plurality of RS chunks is different.

15. The method as claimed in claim 1, wherein the filtered-extended bandwidth DFT-s-OFDM symbol includes a plurality of RS chunks, wherein the size of the plurality of RS chunks is same.

16. The method as claimed in claim 1, wherein the distributed subcarrier mapping includes insertion of zeros in to the extended bandwidth transformed multiplexed sequence.

17. The method as claimed in claim 1, wherein processing the time domain sequence to generate a filtered-extended bandwidth DFT-s-OFDM symbol comprises performing at least one of addition of symbol cyclic prefix, addition of symbol cyclic suffix, windowing, weighted with overlap and add operation (WOLA), and frequency shifting on the time domain waveform, to generate the filtered-extended bandwidth DFT-s-OFDM symbol.

18. The method as claimed in claim 1, wherein a filter used for shaping the extended bandwidth transformed multiplexed sequence is one of a Nyquist filter, square root raised cosine filter, a raised cosine filter, a hamming filter, a Hanning filter, a Kaiser filter, an oversampled GMSK filter and any filter that satisfies predefined spectrum characteristics.

19. The method as claimed in claim 1, wherein the generated filtered-extended bandwidth DFT-s-OFDM symbol transmission is a single shot transmission comprising at least one RS sequence, and at least one of data and control sequence.

20. The method as claimed in claim 1, wherein transmitting the waveform generated is being facilitated using a slot, said slot comprises a plurality of OFDM symbols, said plurality of OFDM symbols includes at least one of: at least one filtered-extended bandwidth DFT-s-OFDM symbol comprising of RS and data at least one filtered-extended bandwidth DFT-s-OFDM symbol comprising of full RS, and at least one filtered-extended bandwidth DFT-s-OFDM symbol comprising of full data.

21. The method as claimed in claim 20, wherein the plurality of OFDM symbols includes at least one of a filtered-extended bandwidth DFT-s-OFDM symbol comprising of RS and data is filtered using a first filter, filtered-extended bandwidth DFT-s-OFDM symbol comprising of RS is filtered using a second filter, filtered-extended bandwidth DFT-s-OFDM symbol comprising of data is filtered using a third filter, said filter have one on one correspondence among each other.

22. The method as claimed in claim 21, wherein said filters are the same.

23. The method as claimed in claim 1, wherein the at least one RS is placed at one of starting position of the multiplexed sequence, ending position of the multiplexed sequence, at both the starting position and ending position of the multiplexed sequence, and at centre position of the multiplexed sequence.

24. The method as claimed in claim 1, wherein transmitting the generated filtered-extended bandwidth DFT-s-OFDM symbol is being facilitated using a slot, said slot comprises a plurality of OFDM symbols, said plurality of OFDM symbols includes at least one of a filtered-extended bandwidth DFT-s-OFDM symbol comprising of RS and data, filtered-extended bandwidth DFT-s-OFDM symbol comprising of RS, and filtered-extended bandwidth DFT-s-OFDM symbol comprising of data.

25. The method as claimed in claim 24, wherein the plurality of OFDM symbols includes at least one of a filtered-extended bandwidth DFT-s-OFDM symbol comprising of RS and data is filtered using a first filter, filtered-extended bandwidth DFT-s-OFDM symbol comprising of RS is filtered using a second filter, filtered-extended bandwidth DFT-s-OFDM symbol comprising of data is filtered using a third filter, said filter have one on one correspondence.

26. The method as claimed in claim 25, wherein said filters are the same.

27. The method as claimed in claim 1, wherein density of filtered-bandwidth extended DFT-s-OFDM symbol comprising RS and data is dependent on at least one of an operating SNR and a Doppler shift between a transmitter and a receiver.

28. The method as claimed in claim 1, wherein density of filtered-bandwidth extended DFT-s-OFDM symbol comprising only RS is dependent on at least one of an operating SNR and a Doppler shift between a transmitter and a receiver.

29. A method for receiving a waveform, the method comprising:

processing, by a receiver, the received waveform to detect a data of interest, wherein:

transmitting the waveform comprises:
  generating, by a transmitter, at least one of: at least one data sequence and at least one reference sequence (RS),
  time-multiplexing, by the transmitter, the at least one data sequence with the at least one RS, to generate a multiplexed sequence, and
  generating, by the transmitter, a filtered-extended bandwidth DFT-s-OFDM symbol using the multiplexed sequence, each of the at least one RS sequence includes at least one RS chunk, at least one of a RS cyclic prefix and a RS cyclic suffix, size of the RS cyclic prefix or RS cyclic suffix depends on one of channel conditions, modulation order, coding rate, impulse response of spectrum shaping filter and power capability of the transmitter, and size of at least one of the RS cyclic prefix and the RS cyclic suffix is one of at least half of the RS chunk size and an arbitrary value.

30. The method as claimed in claim 29, wherein the method comprises a channel estimation using at least one reference sequence (RS) in the received waveform, wherein said channel estimation is used to detect at least one of a data and a control sequence of interest.

31. The method as claimed in claim 29, wherein the received waveform is being facilitated using a slot, said slot comprises a plurality of OFDM symbols, said plurality of OFDM symbols includes at least one of a at least one filtered-extended bandwidth DFT-s-OFDM symbol comprising of RS and data, at least one filtered-extended bandwidth DFT-s-OFDM symbol comprising of full RS, and at least one filtered-extended bandwidth DFT-s-OFDM symbol comprising of full data.

32. The method as claimed in claim 31, wherein the receiver uses at least one of: one or more filtered-extended bandwidth DFT-s-OFDM full RS symbols, one or more filtered-extended bandwidth DFT-s-OFDM symbol comprising RS sequence and a data sequence for channel estimation and equalization.

33. The method as claimed in claim 31, wherein the receiver uses at least one of: one or more filtered-extended bandwidth DFT-s-OFDM full RS symbols, one or more filtered-extended bandwidth DFT-s-OFDM symbols comprising at least one RS and at least one data sequence for phase tracking.

34. The method as claimed in claim 31, wherein the receiver uses at least one of: one or more filtered-extended bandwidth DFT-s-OFDM RS symbols, one or more filtered-extended bandwidth DFT-s-OFDM symbol comprising at least one RS and at least one data sequence for channel tracking over time and equalization of data using tracked channel.

35. The method as claimed in claim 29, wherein processing the received waveform to detect data of interest comprising:
  processing, by the receiver, the received waveform by performing one of coherently adding an extended bandwidth and removal of an extended bandwidth from the received waveform, to obtain a processed sequence;
  estimating the channel from the processed sequence using an estimation method to obtain an estimated channel;
  equalizing the extended bandwidth sequence using the estimated channel to obtain an equalized sequence;
  performing an Inverse Discrete Fourier Transform (IDFT) on the equalized sequence to generate a time domain signal; and
  de-multiplexing the time domain signal to obtain at least one of a reference sequence and a data sequence.

36. The method as claimed in claim 35, wherein the processing step depends on at least one of a RS cyclic prefix and a RS cyclic suffix.

37. The method as claimed in claim 29, wherein processing the received waveform to detect data of interest comprising:
  filtering the received waveform using a subcarrier filter to obtain a filtered received sequence;
  processing the filtered received sequence by performing one of coherently adding an extended bandwidth to the received waveform and removal of an extended bandwidth from the received waveform, to obtain a processed sequence;
  estimating the channel acted on the processed sequence using an estimation method to obtain an estimated channel;
  equalizing the extended bandwidth processed sequence using the estimated channel to obtain an equalized sequence;
  performing an Inverse Discrete Fourier Transform (IDFT) on the equalized sequence to generate a time domain signal; and
  de-multiplexing the time domain signal to obtain at least one of a reference sequence and a data sequence.

38. The method as claimed in claim 37, wherein the subcarrier filter is an arbitrary chosen filter or match to the shaping filter used in the transmitter.

39. The method as claimed in claim 37, wherein the processing step depends on at least one of a RS cyclic prefix and a RS cyclic suffix.

* * * * *